(12) United States Patent
Nihei

(10) Patent No.: US 11,197,044 B2
(45) Date of Patent: Dec. 7, 2021

(54) COMMUNICATION APPARATUS, MEDIA DISTRIBUTION SYSTEM, MEDIA DISTRIBUTION METHOD, AND NON-TRANSITORY COMPUTER READABLE MEDIUM

(71) Applicant: NEC CORPORATION, Tokyo (JP)

(72) Inventor: Koichi Nihei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 72 days.

(21) Appl. No.: 16/497,561

(22) PCT Filed: Mar. 12, 2018

(86) PCT No.: PCT/JP2018/009380
§ 371 (c)(1),
(2) Date: Sep. 25, 2019

(87) PCT Pub. No.: WO2018/180394
PCT Pub. Date: Oct. 4, 2018

(65) Prior Publication Data
US 2021/0105513 A1    Apr. 8, 2021

(30) Foreign Application Priority Data

Mar. 28, 2017 (JP) .............................. JP2017-063328

(51) Int. Cl.
*H04N 21/2343* (2011.01)
*H04N 21/238* (2011.01)
*H04N 21/24* (2011.01)
*H04N 21/442* (2011.01)
(Continued)

(52) U.S. Cl.
CPC ..... *H04N 21/2385* (2013.01); *H04L 12/5601* (2013.01); *H04N 21/23805* (2013.01); *H04N 21/2402* (2013.01); *H04L 2012/5642* (2013.01)

(58) Field of Classification Search
None
See application file for complete search history.

(56) References Cited

U.S. PATENT DOCUMENTS 5,151,779 A * 9/1992 Kanatsugu ............... H04N 5/60
348/904
2013/0297743 A1* 11/2013 Eschet .................... H04L 65/60
709/219

(Continued)

FOREIGN PATENT DOCUMENTS

| JP | 2011-49645 A | 3/2011 |
|---|---|---|
| JP | 2011-82637 A | 4/2011 |

(Continued)

OTHER PUBLICATIONS

R. Pantos, et al., "HTTP Live Streaming draft-pantos-http-live-streaming-20", IETF Internet-Draft, Sep. 20, 2016, 57 pages.

(Continued)

*Primary Examiner* — Brian T Pendleton
*Assistant Examiner* — Jean D Saint Cyr
(74) *Attorney, Agent, or Firm* — Sughrue Mion, PLLC

(57) ABSTRACT

The present disclosure aims to provide a communication apparatus capable of achieving media distribution with a high quality of user experience. A communication apparatus is a communication apparatus configured to distribute media data to another communication apparatus via a plurality of lines, the apparatus including: a communication quality estimation unit configured to estimate communication qualities of the respective lines; a bit rate determination unit configured to calculate, from the estimated communication qualities of the respective lines, an index value indicating a quality of user experience when each of the lines is used and determine a bit rate of the media data based on the calculated index value; and a data allocation unit configured to allocate a data amount of the media data to the respective lines based (Continued)

on the estimated communication qualities of the respective lines and the bit rate that has been determined.

13 Claims, 14 Drawing Sheets

(51) Int. Cl.
*H04N 21/462* (2011.01)
*H04N 21/6379* (2011.01)
*H04N 21/2385* (2011.01)
*H04L 12/54* (2013.01)
*H04L 12/70* (2013.01)

(56) References Cited

U.S. PATENT DOCUMENTS

2015/0156498 A1* 6/2015 Raveendran ....... H04N 21/8456 375/240.02
2016/0088322 A1* 3/2016 Horev .............. H04N 21/23418 725/14

FOREIGN PATENT DOCUMENTS

| JP | 2011-199727 A | 10/2011 |
| JP | 2012-70198 A | 4/2012 |
| JP | 2016-165134 A | 9/2016 |

OTHER PUBLICATIONS

International Standard, ISO/IEC 23009-1, Information technology—Dynamic adaptive streaming over HTTP (DASH)—Part 1: Media presentation description and segment formats, May 15, 2014, 152 pages.

Itu-T G., 1070, Telecommunication Standardization Sector of ITU, Series G: Transmission Systems and Media, Digital Systems and Networks, Multimedia Quality of Service and performance—Generic and user-related aspects, Opinion model for video-telephony applications, Jun. 2018, 32 pages.

International Search Report for PCT/JP2018/009380 dated Jun. 12, 2018 [PCT/ISA/210].

* cited by examiner

Fig. 5

| LINE | AVAILABLE BANDWIDTH [kbps] | TOTAL AVAILABLE BANDWIDTH [kbps] | MOS | MAIN/SUB |
|---|---|---|---|---|
| 3_1 | 1000 | 1000 | 3.93 | MAIN LINE |
| 3_2 | 600 | 1600 | 4.27 | MAIN LINE |
| 3_3 | 300 | 1900 | 4.34 | SUB LINE |

Fig. 6

| LINE | AVAILABLE BANDWIDTH [kbps] | ALLOCATION AMOUNT [byte] |
|---|---|---|
| 3_1 | 1000 | 20000 |
| 3_2 | 600 | 12000 |
| 3_3 | (SUB LINE) | 0 |
| Total | | 32000 |

| LINE | AVAILABLE BANDWIDTH [kbps] | BUFFERING DATA AMOUNT [byte] | ALLOCATED DATA AMOUNT [byte] | TRANSMISSION DATA AMOUNT |
|---|---|---|---|---|
| 3_1 | 1000 | 0 | 21250 | 21250 |
| 3_2 | 600 | 2000 | 10750 | 12750 |
| 3_3 | (SUB LINE) | 0 | 0 | 0 |
| Total | | 2000 | 32000 | 34000 |

Fig. 11

| TOTAL VALUE OF AVAILABLE BANDWIDTH OF ALL LINES [kbps] | MOS THAT CORRESPONDS TO TOTAL VALUE OF AVAILABLE BANDWIDTH OF ALL LINES | DETERMINED BIT RATE [kbps] | MOS THAT CORRESPONDS TO DETERMINED BIT RATE | TOTAL VALUE OF AVAILABLE BANDWIDTH − DETERMINED BIT RATE [kbps] |
|---|---|---|---|---|
| 200 | 2.01 | 180 | 1.91 | 20 |
| 1000 | 3.93 | 910 | 3.83 | 90 |
| 5000 | 4.52 | 2700 | 4.42 | 2300 |
| 20000 | 4.61 | 4600 | 4.52 | 15400 |

Fig. 17

COMMUNICATION APPARATUS, MEDIA DISTRIBUTION SYSTEM, MEDIA DISTRIBUTION METHOD, AND NON-TRANSITORY COMPUTER READABLE MEDIUM

CROSS REFERENCE TO RELATED APPLICATIONS

This application is a National Stage of International Application No. PCT/JP2018/009380, filed on Mar. 12, 2018, which claims priority from Japanese Patent Application No. 2017-063328, filed on Mar. 28, 2017, the contents of all of which are incorporated herein by reference in their entirety.

TECHNICAL FIELD

The present disclosure relates to a communication apparatus, a media distribution system, a media distribution method, and a non-transitory computer readable medium.

BACKGROUND ART

In recent years, opportunities for distributing media data such as video images to remote places via a network in real time have been increasing. In many cases, a network such as the Internet or a radio network in which a high communication quality is not guaranteed is used. Therefore, when the communication rate is reduced, degradation in a media quality (e.g., disturbance or interruption of a video image) occurs. In order to solve this problem, techniques for distributing the media data while switching the quality of media depending on the communication rate have been proposed (e.g., Non-Patent Literature 1 and 2).

If the speed in the communication line is low, however, even when the techniques disclosed in Non-Patent Literature 1 and 2 are used, high-quality media distribution cannot be achieved. In order to solve this problem, techniques for improving a total value of communication rates using a plurality of communication lines to improve the media quality have been proposed (e.g., Patent Literature 1).

In Patent Literature 1, a client device includes a plurality of communication interfaces, and the content downloaded by the respective interfaces are complementary (do not overlap each other). The client device determines a requested bit rate based on a bit rate (communication rate) that each communication interface can use, and downloads the content using a plurality of interfaces.

CITATION LIST

Patent Literature

[Patent Literature 1] Japanese Unexamined Patent Application Publication No. 2016-165134

Non-Patent Literature

[Non-Patent Literature 1] IETF Internet-Draft: HTTP Live Streaming draft-pantos-http-live-streaming-20
[Non-Patent Literature 2] ISO/IEC 23009-1:2014 Dynamic adaptive streaming over HTTP (DASH)—Part 1: Media presentation description and segment formats

SUMMARY OF INVENTION

Technical Problem

In the technique disclosed in Patent Literature 1, however, while the requested bit rate is determined from the communication rate of each communication interface, the quality of user experience (QoE: Quality of Experience) is not taken into consideration. Therefore, in the technique disclosed in Patent Literature 1, it is possible that the quality of user experience (QoE) may be reduced.

The present disclosure has been made in order to solve the above problem, and aims to provide a communication apparatus, a media distribution system, and a media distribution method capable of performing media distribution with a high quality of user experience.

Solution to Problem

A communication apparatus according to a first aspect of the present disclosure is a communication apparatus configured to distribute media data to another communication apparatus via a plurality of lines, the communication apparatus including: a communication quality estimation unit configured to estimate communication qualities of the respective lines; a bit rate determination unit configured to calculate, from the estimated communication qualities of the respective lines, an index value indicating a quality of user experience when each of the lines is used and determine a bit rate of the media data based on the calculated index value; and a data allocation unit configured to allocate a data amount of the media data to the respective lines based on the estimated communication qualities of the respective lines and the bit rate that has been determined.

A media distribution system according to a second aspect of the present disclosure is a media distribution system including a transmission apparatus and a reception apparatus, the media distribution system distributing media data from the transmission apparatus to the reception apparatus via a plurality of lines, in which the transmission apparatus includes: a communication quality estimation unit configured to estimate communication qualities of the respective lines; a bit rate determination unit configured to calculate, from the estimated communication qualities of the respective lines, an index value indicating a quality of user experience when each of the lines is used and determine a bit rate of the media data based on the calculated index value; and a data allocation unit configured to allocate a data amount of the media data to the respective lines based on the estimated communication qualities of the respective lines and the bit rate that has been determined.

A media distribution method according to a third aspect of the present disclosure is a media distribution method for distributing media data to another communication apparatus via a plurality of lines, the method including: estimating communication qualities of the respective lines; calculating, from the estimated communication qualities of the respective lines, an index value indicating a quality of user experience when each of the lines is used and determining a bit rate of the media data based on the calculated index value; and allocating a data amount of the media data to the respective lines based on the estimated communication qualities of the respective lines and the bit rate that has been determined.

Advantageous Effects of Invention

According to the present disclosure, it becomes possible to perform media distribution with a high quality of user experience.

BRIEF DESCRIPTION OF DRAWINGS

FIG. 5 is a diagram for explaining one example of a method of allocating media data;

FIG. 6 is a diagram for explaining one example of a method of allocating media data;

FIG. 11 is a diagram for explaining one example of data allocation according to the modified example of the first example embodiment;

FIG. 17 is a diagram for explaining a bit rate determination operation according to a fourth example embodiment.

DESCRIPTION OF EMBODIMENTS

Hereinafter, with reference to the drawings, example embodiments will be explained. In the example embodiments, the same elements are denoted by the same reference symbols and overlapping descriptions will be omitted as appropriate.

(Outline of Example Embodiments)

Figure 1:
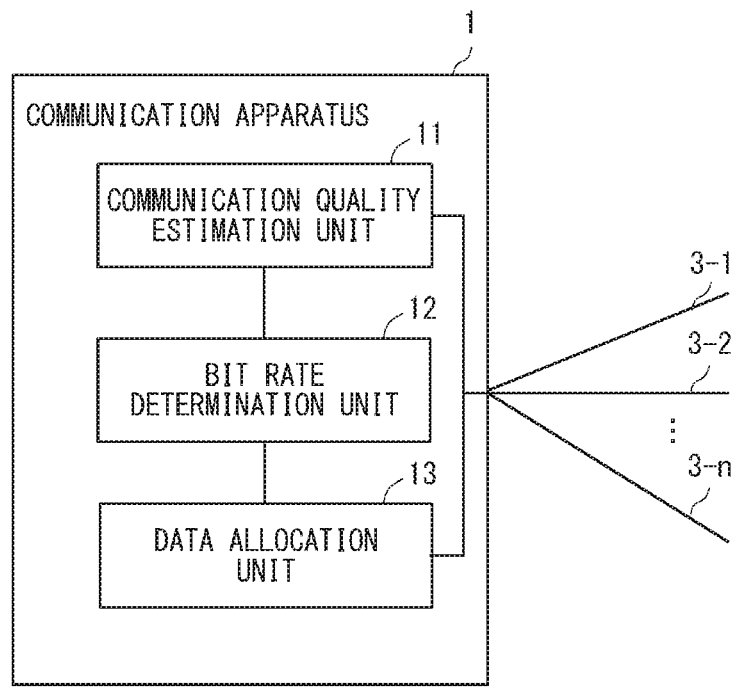
FIG. 1 is a configuration diagram showing a configuration example of a communication apparatus according to an outline according to example embodiments.

Prior to giving the description of example embodiments, an outline of the example embodiments will be explained. FIG. 1 is a configuration diagram showing a configuration example of a communication apparatus 1 according to the outline of the example embodiments. The communication apparatus 1 is a communication apparatus that distributes media data to other communication apparatuses (not shown) via a plurality of lines (lines 3_1 to 3_n, n is any integer equal to or larger than two). The communication apparatus 1 may be, for example, a mobile telephone, a smartphone, a tablet terminal, or a personal computer. The plurality of lines 3_1 to 3_n may be a wired line or a wireless line, or may be a mixture of a wired line and a wireless line. The media data may be, for example, a video image, a voice, and sensor information such as a tactile sense or a force sense. In the following description, the plurality of lines (lines 3_1 to 3_n) may be collectively referred to as a line 3 and each of the plurality of lines (lines 3_1 to 3_n) may be referred to as each line 3.

The communication apparatus 1 includes a communication quality estimation unit 11, a bit rate determination unit 12, and a data allocation unit 13.

The communication quality estimation unit 11 estimates communication qualities of the respective lines 3 between the communication apparatus 1 and another communication apparatus. The communication quality may be, for example, a communication rate such as an available bandwidth, communication throughput or the like, a communication rate calculated from time required to transmit or receive the media data, or time required to transmit or receive the media data to be distributed.

The bit rate determination unit 12 calculates, from the communication qualities of the respective lines 3 estimated by the communication quality estimation unit 11, an index value indicating the quality of user experience when each line 3 is used, and determines the bit rate of the media data to be distributed based on the calculated index value indicating the quality of user experience. The bit rate determination unit 12 determines the bit rate of the media data to be distributed in such a way that the calculated index value indicating the quality of user experience increases. The index value indicating the quality of user experience may be, for example, Quality of Experience (QoE) indicating the quality of user experience, Mean Opinion Score (MOS), which is an average value of the QoE, or the like.

The data allocation unit 13 determine the amount of the distributed media data to be allocated to the respective lines 3 based on the results of the estimation of the communication qualities of the respective lines 3 estimated by the communication quality estimation unit 11 and the bit rate of the media data determined by the bit rate determination unit 12, and allocates the data amount that has been determined to the respective lines 3.

In the communication apparatus 1 according to the example embodiments, the bit rate determination unit 12 calculates, from the communication qualities of the respective lines 3 estimated by the communication quality estimation unit 11, the index value indicating the quality of user experience when each of the lines 3 is used, and determines the bit rate of the media data to be distributed based on the calculated index value indicating the quality of user experience. Therefore, with the communication apparatus 1 according to the example embodiments, it becomes possible to perform media distribution in view of the quality of user experience. That is, it becomes possible to perform media distribution with a high quality of user experience.

Then the data allocation unit 13 determines the data amount of the media data to be distributed to the respective lines 3 based on the results of the estimation of the communication qualities of the respective lines 3 estimated by the communication quality estimation unit 11 and the bit rate determined by the bit rate determination unit 12. Further, as described above, the bit rate determination unit 12 determines the bit rate of the media data to be distributed in such a way that the calculated index value indicating the quality of user experience when each of the lines 3 is used becomes large. Therefore, with the communication apparatus 1 according to the example embodiments, it becomes possible to perform media distribution with a high quality of user experience.

First Example Embodiment

Figure 2:
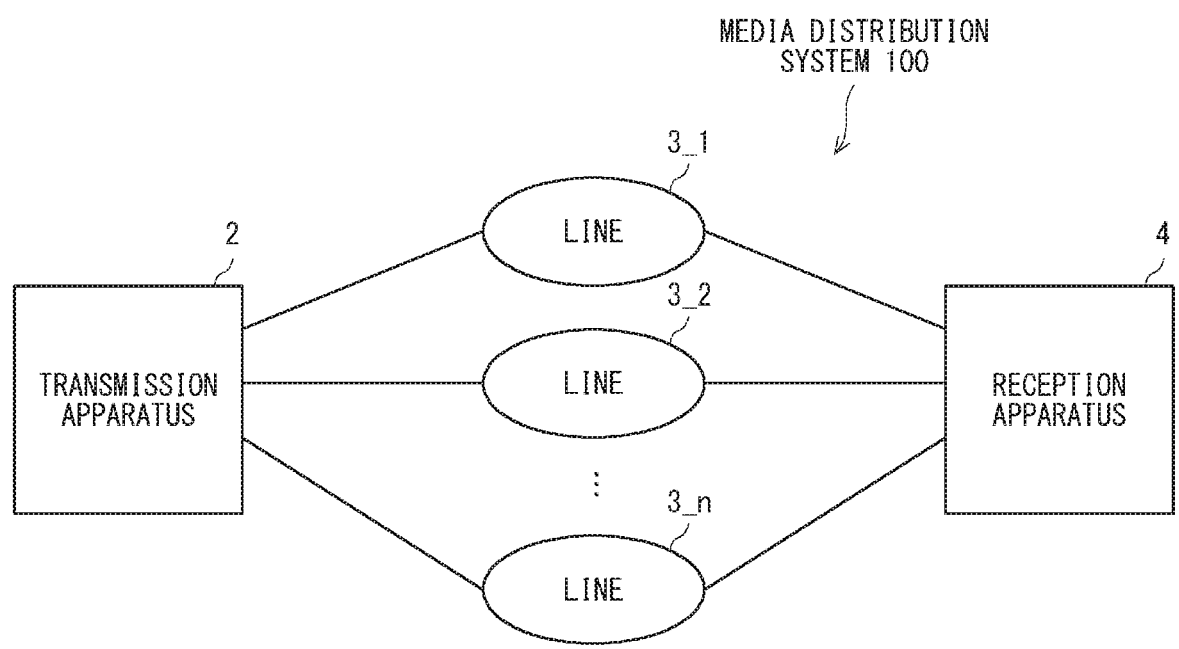
FIG. 2 is a schematic view showing one example of a media distribution system according to a first example embodiment.

Hereinafter, with reference to the drawings, example embodiments of the present disclosure will be will be explained. With reference to FIG. 2, a media distribution system 100 according to a first example embodiment will be explained. FIG. 2 is a schematic view showing one example of the media distribution system 100 according to the first example embodiment.

The media distribution system 100 is a system for distributing media data to a reception apparatus 4 from a transmission apparatus 2 via a plurality of lines (lines 3_1 to 3_n). The media data may be, for example, a video image, a voice, sensor information such as a tactile sense or a force sense, or the like. The media distribution system 100 may be a system such as a live video distribution system for distributing a captured video image and a voice to a remote place, a TV conference system for performing communication between remote places, a telepresence system, or a remote operation system that uses a tactile sense or force sense information.

The media distribution system 100 includes the transmission apparatus 2 for distributing the media data, the lines 3_1 to 3_n, and the reception apparatus 4 for receiving the media data distributed from the transmission apparatus 2.

Each of the transmission apparatus 2 and the reception apparatus 4 may be, for example, a mobile telephone, a smartphone, a tablet terminal, a personal computer or the like. The transmission apparatus 2 corresponds to the communication apparatus 1 described in the outline of the example embodiments. The reception apparatus 4 corresponds to the other communication apparatus described in the outline of the example embodiments. The lines 3 may be a wired line, a wireless line, or a mixture of a wired line and a wireless line. The lines 3 may be composed of, for example, any combination such as a wired line provided by one operator, a combination of a wired line and a mobile line provided by different operators, a plurality of mobile lines provided by one operator, a combination of mobile lines provided by different operators, or a combination of a mobile line and a public wireless Local Area Network (LAN), or a combination of 2.4 GHz wireless LAN and 5 GHz wireless LAN.

Figure 3:
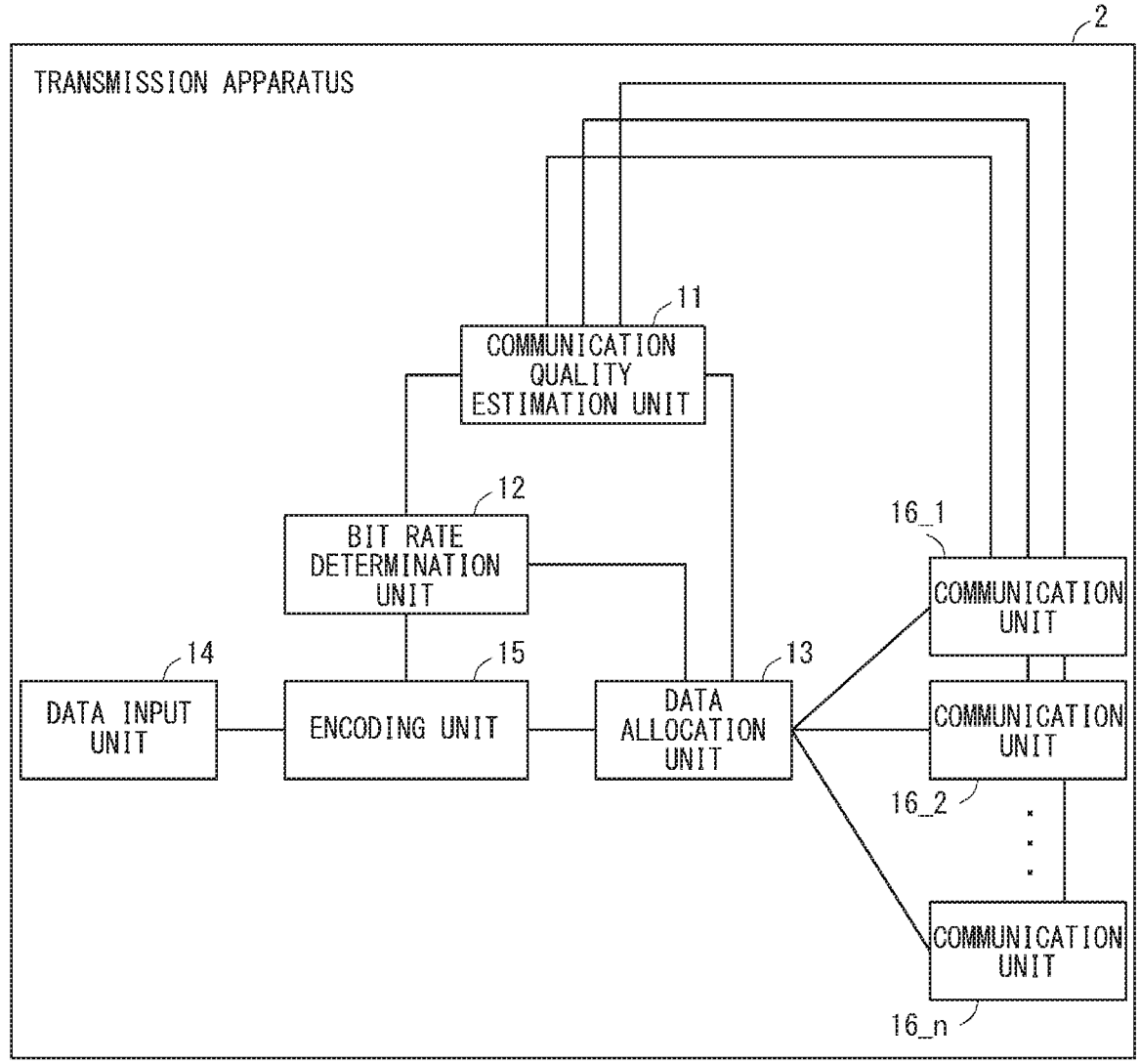
FIG. 3 is a configuration diagram showing one example of a transmission apparatus according to the first example embodiment.

With reference next to FIG. 3, a configuration example of the transmission apparatus 2 will be explained. FIG. 3 is a configuration diagram showing one example of the transmission apparatus 2 according to the first example embodiment. The transmission apparatus 2 includes a communication quality estimation unit 11, a bit rate determination unit 12, a data allocation unit 13, a data input unit 14, an encoding unit 15, and communication units 16_1 to 16_n. Now, n is an integer equal to or larger than two whose number is equal to the number of lines 3. In the following description, the communication units 16_1 to 16_n may be collectively referred to as a communication unit 16 and each of the communication units 16_1 to 16_n may be referred to as each communication unit 16.

The communication quality estimation unit 11 corresponds to the communication quality estimation unit 11 described in the outline of the example embodiments. The communication quality estimation unit 11 estimates communication qualities of the plurality of respective lines 3_1 to 3_n based on the information acquired by the communication units 16_1 to 16_n described later. After the communication quality estimation unit 11 estimates the communication qualities of the respective lines 3_1 to 3_n, the communication quality estimation unit 11 notifies the bit rate determination unit 12 and the data allocation unit 13 that will be described later of the communication qualities of the respective lines 3_1 to 3_n that have been estimated.

Here, one example of the communication quality will be explained. The communication quality may be, for example, an amount of data that can be communicated per unit time (bps: bit per second). In this case, specifically, the communication quality may be a communication rate such as an available bandwidth or communication throughput. The communication quality may be a communication rate calculated from time required to transmit or receive the media data. When, for example, the media data includes a video image, the communication quality may be "frame size/time required to receive data that forms this frame" for each video frame calculated in the reception apparatus 4. Alternatively, "frame size/time required to receive data that forms the frame" may be calculated in the transmission apparatus 2 using reception time of an acknowledgment packet (ack packet) indicating that the media data packet that transmits the media data from the transmission apparatus 2 has been normally received, the acknowledgment packet (ack packet) being transmitted from the reception apparatus 4, and the obtained value may be used as the communication quality. Alternatively, when variations in the value calculated for each frame are large, filtering processing such as exponential smoothing may be performed in the transmission apparatus 2 or the reception apparatus 4, and a value obtained by multiplying the value calculated by the above processing by a coefficient (e.g., 0.9) may be used as the communication quality in order to prevent overestimation. Alternatively, the communication quality may be time required to transmit or receive the media data or the like. In this specification, for the sake of convenience of explanation, the communication quality is described as an available bandwidth. However, the present disclosure is not limited thereto.

The bit rate determination unit 12 corresponds to the bit rate determination unit 12 in the outline of the example embodiments. The bit rate determination unit 12 calculates, from the communication qualities of the respective lines 3 estimated by the communication quality estimation unit 11, the index value indicating the quality of user experience when each of the lines 3 is used, and determines the bit rate of the media data to be distributed based on the calculated index value. The bit rate determination unit 12 determines the bit rate of the media data to be distributed in such a way that the calculated index value regarding the quality of user experience increases. The index value indicating the quality of user experience may be, for example, the QoE that indicates the quality of user experience, the MOS, which is an average value of the QoE or the like. Upon determining the bit rate of the media data to be distributed, the bit rate determination unit 12 notifies the data allocation unit 13 and the encoding unit 15 that will be described later of the bit rate that has been determined.

Now, a method in which the bit rate determination unit 12 determines the bit rate of the media data to be distributed will be explained. The bit rate determination unit 12 determines the bit rate of the media data based on the MOS. The bit rate is a data amount per unit time.

It has been known that, when, for example, the media distribution is video distribution, the QoE increases as the bit rate increases, whereas the amount of increase in the bit rate and the amount of increase in the QoE have a non-linear relationship. As a method of calculating (estimating) the QoE in a video conference, the method defined by ITU-T G.1070 has been known. In the method defined by ITU-T G.1070, the MOS, which is the average value of the QoE, is estimated from information such as the bit rate of the video image that can be physically observed. The MOS is a numerical value between 1 and 5, and a larger value indicates a higher QoE.

Figure 4:
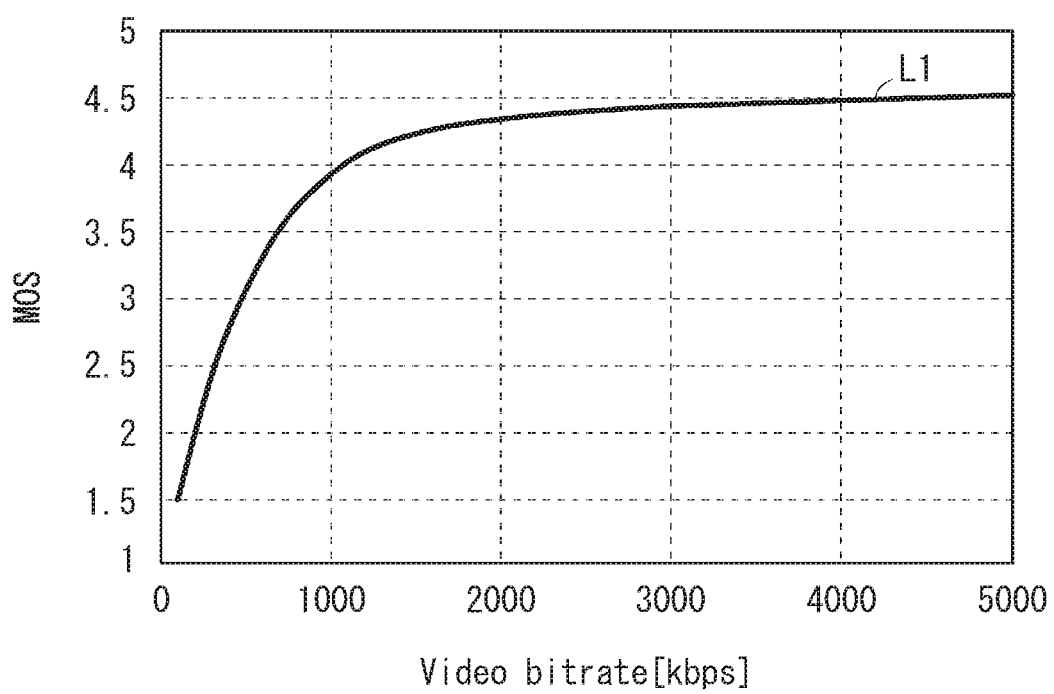
FIG. 4 is a diagram showing a relation between a bit rate and an MOS.

FIG. 4 is a diagram showing a relation between the bit rate and the MOS, and is a diagram showing the MOS when only the bit rate of the parameters of ITU-T G.1070 is changed. The horizontal axis in FIG. 4 indicates a video bit rate [kbps], and the bit rate increases toward the right side of FIG. 4. The vertical axis shown in FIG. 4 is the MOS estimated value calculated in ITU-T G.1070 and indicates that the MOS becomes higher, that is, the QoE becomes higher toward the upper side of FIG. 4. In FIG. 4, the curved line L1 is a curved line indicating a relation between the video bit rate and the MOS. In FIG. 4, in a region in which the video bit rate is low, the inclination of the curved line L1 is large. Therefore, even when the bit rate is slightly increased, the MOS is dramatically improved. That is, the QoE is greatly improved. On the other hand, in a region in which the video bit rate is high, the inclination of the curved line L1 is smaller than that in the region in which the bit rate is low. Even when the bit rate is increased, the MOS is not substantially changed.

Next, the amount of improvement of the QoE when a plurality of lines for transmitting the media data from the transmission apparatus 2 are used will be explained. Assume a case in which, for example, the transmission apparatus 2 distributes the media data to the reception apparatus 4 via two lines, and the available bandwidth of the both lines is 100 kbps. In this case, as shown in FIG. 4, when the transmission apparatus 2 transmits a video image of 100 kbps using one line, the MOS becomes 1.50. On the other hand, when the transmission apparatus 2 transmits a video image of 200 kbps using two lines, the MOS becomes 2.01. Compared to a case in which one line is used, the MOS is improved by 0.51 in the case in which two lines are used.

Next, assume a case in which the transmission apparatus 2 distributes the media data to the reception apparatus 4 via two lines and the available bandwidth of both of the two lines is 2000 kbps. When the transmission apparatus 2 has transmitted a video image of 2000 kbps using one line, the MOS becomes 4.35. On the other hand, when the transmission apparatus 2 has transmitted a video image of 4000 kbps using the two lines, the MOS becomes 4.49. Compared to the case in which one line is used, the amount of improvement of the MOS in the case in which two lines are used is 0.14. Therefore, the amount of improvement of the MOS is smaller than that of a case in which the two lines of 100 kbps are used.

It is further assumed that the transmission apparatus 2 distributes the media data to the reception apparatus 4 via the two lines. When the video data is allocated using two lines, all the pieces of video data transmitted in the both lines are received, whereby the video data can be reproduced. In other words, even when the data transmitted in one line has been successfully received, the video data cannot be reproduced unless the data transmitted in the other line can be received. Therefore, if the available bandwidth is reduced sharply in one of the lines, the delay until the video image transmitted from the transmission apparatus 2 is reproduced is increased in the reception apparatus 4.

It is assumed here that the media data is distributed using two lines (e.g., the lines 3_1 and 3_2) of the lines 3 connected to the transmission apparatus 2. In this case, when the probability that the available bandwidth of the line 3_1 is reduced sharply is denoted by p1 and the probability that the available bandwidth of the line 3_2 is reduced sharply is denoted by p2, the probability that at least one available bandwidth is dramatically reduced is p1+(1−p1)p2. Since p1 and p2 are both numerical values between 0 and 1, the value indicating the probability that at least one available bandwidth is dramatically reduced becomes larger than the probability p1 that the available bandwidth is reduced sharply by using only the line 3_1. That is, when the media data is distributed using a plurality of lines, the probability that the media quality is degraded due to the reduction in the available bandwidth increases. Therefore, when the QoE is not substantially increased even when the bit rate is increased using a plurality of lines, it may be preferable not to use a plurality of lines. The above description is not limited to the case in which the media data is, for example, video data, and can be applied also to a case in which the media data is another type of media data such as voice data.

The bit rate determination unit 12 according to this example embodiment calculates, for each of the lines 3_1 to 3_n, how much the MOS is improved (that is, improved value of the MOS) in the case in which the line is used for distribution of the media data compared to the MOS in the case in which this line is not used. That is, the bit rate determination unit 12 calculates how much the QoE is improved when this line is used. Then the bit rate determination unit 12 calculates the improved value of the MOS when this line is used. When the improved value of the MOS that has been calculated is equal to or larger than a predetermined threshold, this line is classified into the main line that mainly performs transmission of the media data. On the other hand, when the amount of improvement of the MOS is smaller than the predetermined threshold, this line is classified into the sub line, which is an auxiliary line of the main line.

Further, after the bit rate determination unit 12 has classified all the lines into the main lines and the sub lines, the bit rate determination unit 12 determines the total value of the available bandwidth of all the lines that have been classified into the main lines as the bit rate of the media data. Alternatively, the bit rate determination unit 12 may determine a value obtained by multiplying the total value of the available bandwidth of all the lines that have been classified into the main lines by, for example, a predetermined coefficient such as 0.9 to be the bit rate of the media data. A more specific operation of determining the bit rate will be explained later.

Referring once again to FIG. 3, description regarding a configuration example of the transmission apparatus 2 will be continued. The data allocation unit 13 corresponds to the data allocation unit 13 in the outline of the example embodiments. The data allocation unit 13 determines how to allocate the media data encoded by the encoding unit 15 that will be described later to the lines 3_1 to 3_n based on the communication qualities of the lines 3_1 to 3_n estimated by the communication quality estimation unit 11 and the bit rate determined by the bit rate determination unit 12. Specifically, the data allocation unit 13 allocates, to the lines 3_1 to 3_n, the data amount of the media data to be distributed. After the data allocation unit 13 determines the amount of data to be allocated to the respective lines 3_1 to 3_n, the data allocation unit 13 transmits the media data to be distributed by the determined data amount to the communication units 16_1 to 16_n that correspond to the lines 3_1 to 3_n.

Here, allocation of the media data that the data allocation unit 13 transmits to the lines 3_1 to 3_n will be explained. When the media data such as a video image is distributed, the QoE depends not only on the bit rate but also on the reproduction delay. The reproduction delay is time required for the media data to be input from the data input unit 14 (described later) of the transmission apparatus 2 and output from a data output part (not shown) of the reception apparatus 4. The QoE becomes higher as the reproduction delay is shorter and becomes lower as the reproduction delay is longer. Therefore, in order to improve the QoE, it is desirable to minimize the reproduction delay. When, for example, the media data to be distributed is video data and video data of one frame is divided into three pieces of video data and the divided video data is transmitted to the lines 3_1 to 3_n, the reception apparatus 4 cannot output this video data until the reception of all the pieces of data of this frame is completed. Therefore, in order to reduce the reproduction delay and to improve the QoE, it is desirable to minimize the maximum value of the reproduction delay of the lines 3_1 to 3_n. The reproduction delay includes a process delay that occurs during processing of the media data that has been input to the data input unit 14 that will be explained later inside the transmission apparatus 2 and a transmission delay that occurs while the media data is being transmitted to the reception apparatus 4 from the transmission apparatus 2 via the lines 3_1 to 3_n. In this example embodiment, the reproduction delay is minimized by minimizing the transmission delay.

In this example embodiment, the data allocation unit 13 transmits the media data to be transmitted to the reception apparatus 4 using the main lines classified by the bit rate determination unit 12 in order to minimize the transmission delay. That is, the data allocation unit 13 uses all the lines that have been classified into the main lines, whereby the transmission delay, that is, the reproduction delay, is minimized, and media distribution with high MOS can be achieved. Therefore, the data allocation unit 13 uses the lines that the bit rate determination unit 12 has classified into the main lines.

In order to minimize the transmission delay, the data allocation unit 13 allocates the data amount of the media data in such a way that the ratio of the available bandwidth of the respective lines 3 classified into the main lines matches the ratio of the amount of data to be allocated to the respective lines 3 classified into the main lines.

FIGS. 5 and 6 are diagrams for explaining one example of the method in which the data allocation unit 13 allocates the media data. FIG. 5 shows, from the left to the right, the line number, the available bandwidth of the respective lines, the total available bandwidth of the lines 3_1 to 3_(line number), the MOS that corresponds to the total available bandwidth of the lines 3_1 to 3_(line number), and classification of the main line or the sub line of each line. FIG. 6 shows, from the left to the right, the line number, the available bandwidth of the respective lines, and allocated data amount to the respective lines. The lowest part in FIG. 6 shows the total data amount of the media data that the transmission apparatus 2 transmits to the reception apparatus 4.

As shown in FIG. 5, it is assumed that the media data is distributed to the reception apparatus 4 from the transmission apparatus 2 via three lines (e.g., the lines 3_1 to 3_3) and the bit rate determination unit 12 has determined the lines 3_1 and 3_2 to be the main lines and the line 3_3 to be the sub line. When the available bandwidth of the line 3_1 is 1000 kbps and the available bandwidth of the line 3_2 is 600 kbps, the ratio of the available bandwidth of the line 3_1 to that of the line 3_2 becomes the ratio of 1000:600=5:3. The data allocation unit 13 allocates the media data to be distributed (e.g., video frame data) in such a way that the ratio of the amount of data allocated to the the line 3_1 to that allocated to the line 3_2 becomes 5:3.

Next, when it is assumed, for example, that the media data of 32000 bytes is distributed from the transmission apparatus 2 to the reception apparatus 4, as shown in FIG. 6, the data allocation unit 13 allocates data in such a way that the data amount of the media data to be distributed via the line 3_1 and that via the line 3_2 becomes 5:3. That is, the data allocation unit 13 allocates 20000 bytes to the line 3_1 and allocates 12000 bytes to the line 3_2.

Referring once again to FIG. 3, the description of the configuration example of the transmission apparatus 2 will be continued. The data input unit 14 receives the media data that the transmission apparatus 2 distributes. The media data may be media data input from the outside of the transmission apparatus 2, or may be media data acquired by the transmission apparatus 2. Further, the media data may be, for example, a video image, a voice, sensor information such as a tactile sense or a force sense, or a combination thereof.

When the media data includes a video image, the media data may be a video image acquired from a camera embedded in the transmission apparatus 2 or a video image input from a camera connected through an interface such as USB, HDMI (registered trademark) or the like. This video image may be input, for example, for each frame at a cycle of several tens of milliseconds to several hundreds of milliseconds.

When the media data includes a voice, the media data may be a voice acquired from a microphone or the like embedded in the transmission apparatus 2 or a voice input from a microphone or the like connected through an interface such as USB. In this case, for example, a voice sample sampled at several kilohertz to several tens of kilohertz may be input by units of a few milliseconds to hundreds of milliseconds.

When the media data is information of a sensor or the like, the media data may be sensor information acquired from a sensor or the like embedded in the transmission apparatus 2 or sensor information input from a sensor or the like connected through an interface such as USB. This sensor information may be, for example, input at a cycle from a few milliseconds to a few seconds.

The encoding unit 15 encodes (compresses) the media data input from the data input unit 14 in such a way that this data has a bit rate (the data amount per unit time) regarding which a notification has been sent from the bit rate determination unit 12.

When the media data to be input to the data input unit 14 is a video image, the encoding unit 15 may use, for example, an encoding system such as H.264 or H.265. When the media data to be input to the data input unit 14 is a voice, the encoding unit 15 may use an encoding system such as G.711, G.729, Adaptive Multi-Rate (AMR)-Narrow Band (NB)/Wide Band (WB), Advanced Audio Coding (AAC).

When the media data to be input to the data input unit 14 is sensor information, the encoding unit 15 may be compressed by, for example, controlling the transmission interval of information, the resolution of information to be transmitted or the like or transmitting only the difference from the value immediately transmitted. These processing may be performed by software operated on the transmission apparatus 2 or by hardware when a dedicated hardware is available.

The communication units 16_1 to 16_n are communication interfaces that communicate with the reception apparatus 4 via the lines 3_1 to 3_n, respectively. The communication units 16_1 to 16_n may be, for example, communication interfaces embedded in the transmission apparatus 2 or may be communication interfaces that enable communication by being connected by USB or the like. The communication units 16_1 to 16_n may each be, for example, a communication interface such as a mobile line like a wired LAN, a wireless LAN, or Long Term Evolution (LTE) that is provided by a communication operator. The communication units 16_1 to 16_n may be communication interfaces of one type or may be a combination of communication interfaces different from one another.

The communication units 16_1 to 16_n acquire information for enabling the communication quality estimation unit 11 to estimate the communication qualities of the respective lines 3_1 to 3_n, and transmit the acquired information to the communication quality estimation unit 11. When the communication quality is the communication rate (e.g., an available bandwidth), the communication units 16_1 to 16_n may acquire information on the available bandwidth of the lines 3_1 to 3_n. Further, when the communication quality is a communication rate (e.g., communication throughput), the communication units 16_1 to 16_n may calculate the communication throughput from the amount of data to be transmitted to the lines 3_1 to 3_n. Alternatively, when the communication quality is a communication rate (e.g., "frame size/time required to receive data that forms the frame"), the communication units 16_1 to 16_n may acquire the frame size and time, receive the aforementioned calculation result from the reception apparatus 4, or acquire reception time at which the acknowledgment packet is received. Alternatively, when the communication quality is time required to transmit or receive the media data or the like, the communication units 16_1 to 16_n may calculate this time from the time at which the transmission apparatus 2 has transmitted the media data and the time at which the reception apparatus 4 has received the media data, or from the time at which the transmission apparatus 2 has transmitted the media data and the reception time at which the acknowledgment packet is received.

Further, the communication units 16_1 to 16_n transmit the media data transmitted from the data allocation unit 13 to the reception apparatus 4 via the respective connecting lines 3.

Figure 7:
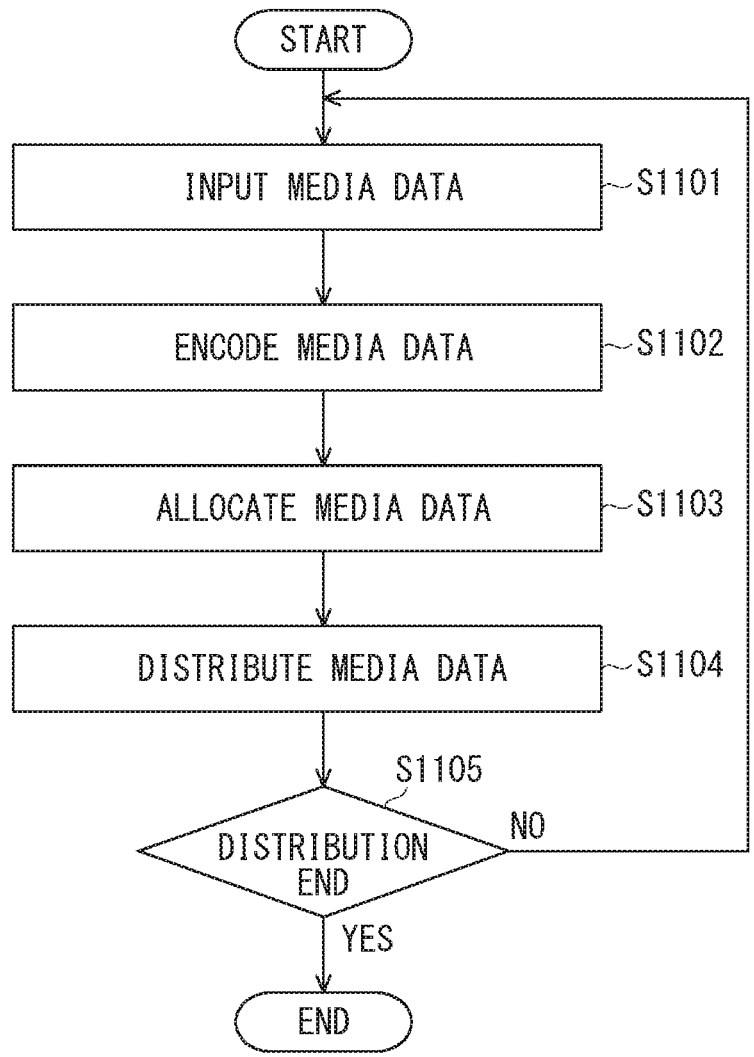
FIG. 7 is a flowchart showing one example of an overall operation of a transmission apparatus according to the first example embodiment.
Figure 8:
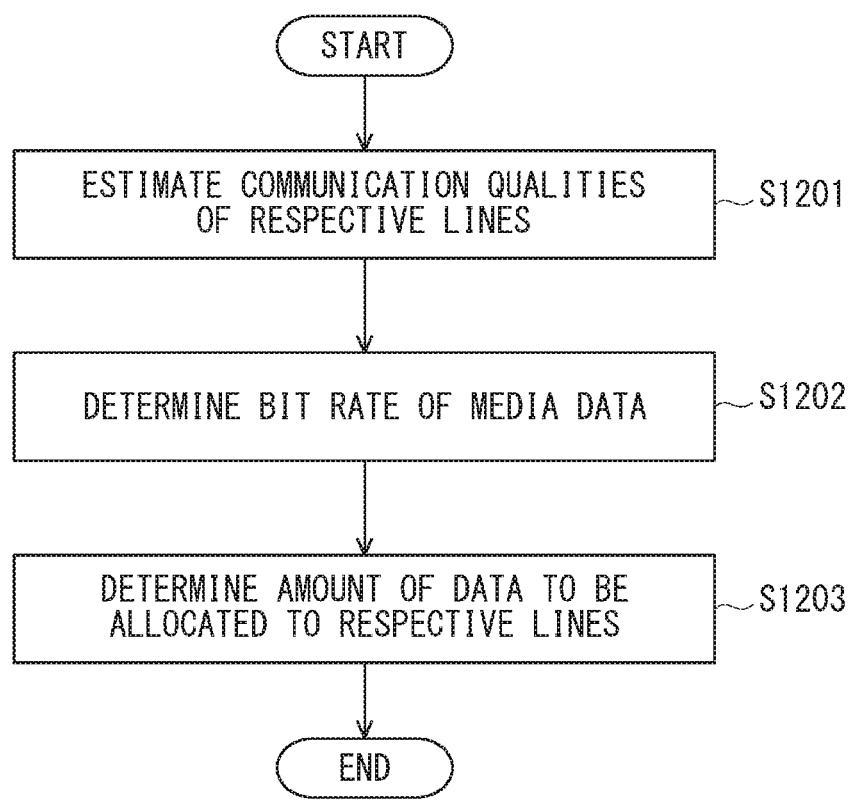
FIG. 8 is a flowchart showing one example of a bit rate determination operation according to the first example embodiment.
Figure 9:
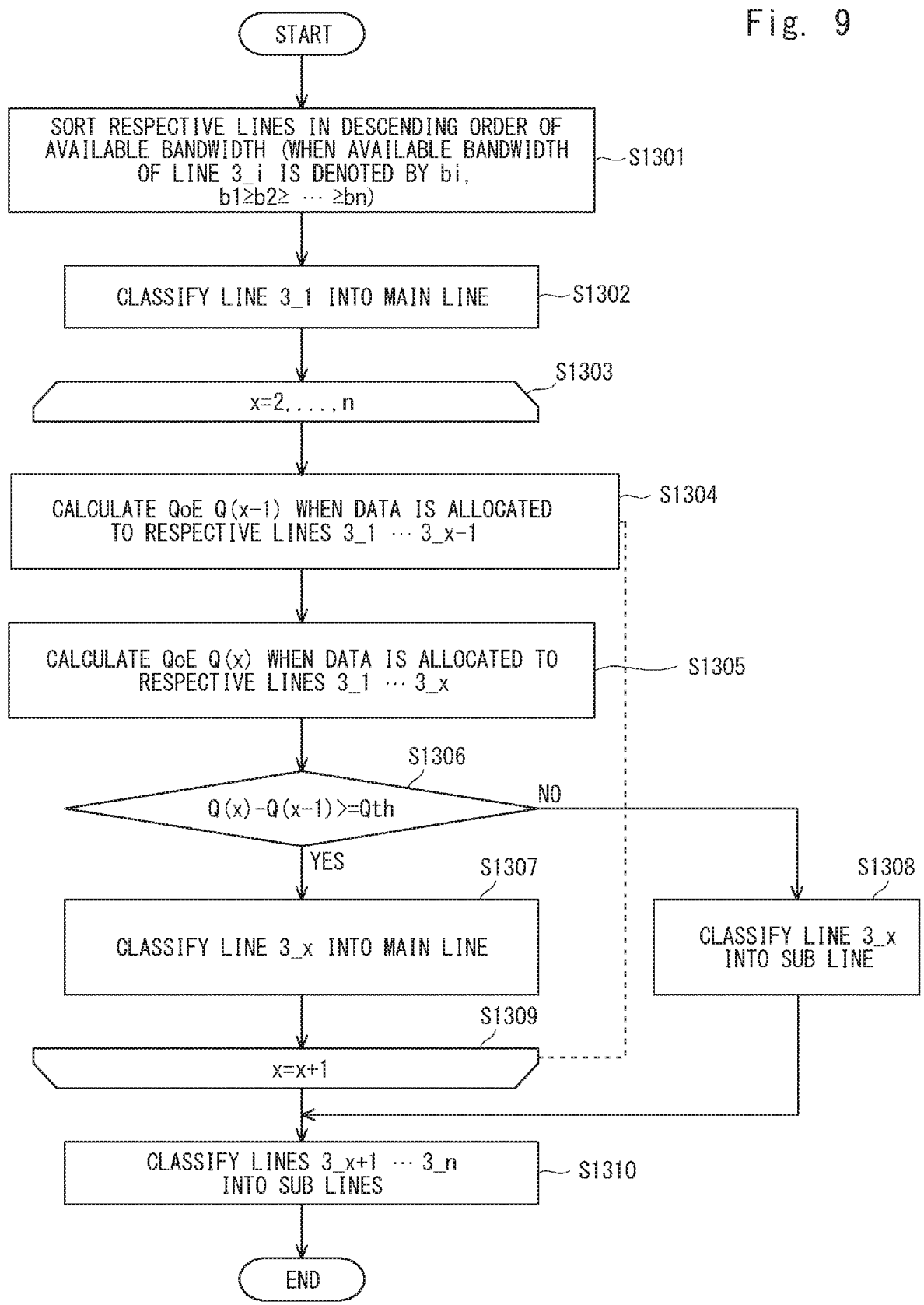
FIG. 9 is a flowchart showing one example of an operation of classifying lines into main lines and sub lines according to the first example embodiment.

With reference next to FIGS. 7 to 9, an operational example of the transmission apparatus 2 according to this example embodiment will be explained. FIG. 7 is a flowchart showing one example of an overall operation of the transmission apparatus 2 according to this example embodiment. FIG. 8 is a flowchart showing one example of the bit rate determination operation according to this example embodiment. FIG. 9 is a flowchart showing one example of an operation of classifying the lines into the main lines and the sub lines according to this example embodiment.

With reference first to FIG. 7, one example of the overall operation of the transmission apparatus 2 according to this example embodiment will be explained. As shown in FIG. 7, the data input unit 14 accepts input of the media data (Step S1101). When the media data is a video image, the media data is input from a camera or the like embedded in the transmission apparatus 2, or a camera or the like connected through an interface such as USB or HDMI (registered trademark) for each frame, for example. When, for example, the frame rate is 10, the media data to be input may be input at a cycle of 100 milliseconds. When, for example, the frame rate is 33, the media data to be input may be input at a cycle of 33.33 . . . milliseconds. Further, when the media data is a voice, operational information, sensor information or the like, the media data to be input may be input from a microphone or a sensor embedded in the transmission apparatus 2, or from a microphone or a sensor connected thereto at a certain cycle such as 20 milliseconds, for example.

Next, the encoding unit 15 encodes the media data input from the data input unit 14 (Step S1102). At this time, the encoding unit 15 sets parameters or the like in such a way that the bit rate becomes the one instructed from the bit rate determination unit 12. When, for example, the bit rate determination unit 12 has determined the bit rate to be 1 Mbps, the media data is encoded in such a way that the total data amount to be distributed in one second becomes 1 Mbit. The bit rate determination unit 12 determines the bit rate in the bit rate determination operation shown in FIG. 8 that will be described later.

Next, the data allocation unit 13 determines, based on the bit rate of the media data received from the bit rate determination unit 12 and the communication qualities of the respective lines 3 received from the communication quality estimation unit 11, how to allocate the media data encoded in the encoding unit 15 to the lines 3_1 to 3_n and transmits the results of the determination to the communication units 16_1 to 16_n that correspond to the lines 3_1 to 3_n, respectively (Step S1103).

Specifically, the data allocation unit 13 determines the amount of data to be distributed to the respective lines based on the bit rate of the media data received from the bit rate determination unit 12 and the available bandwidth of the respective lines 3 received from the communication quality estimation unit 11. More specifically, as described above, the data allocation unit 13 transmits the media data to be transmitted to the reception apparatus 4 using the main lines classified by the bit rate determination unit 12. Further, the data allocation unit 13 allocates the data amount of the media data in such a way that the ratio of the available bandwidth of the respective lines 3 classified into the main lines matches the ratio of the amount of data to be allocated to the respective lines 3 classified into the main lines.

When, for example, the number of lines to which the transmission apparatus 2 is connected is two (e.g., the lines 3_1 and 3_2) and it has been determined that the amount of data allocated to the line 3_1 and the line 3_2 are 400 kbps and 600 kbps, respectively, the data allocation unit 13 allocates data in such a way that the ratio of the media data to be distributed to the line 3_1 and that to be distributed to the line 3_2 becomes 4:6. The data allocation unit 13 determines the amount of data to be allocated to the respective lines in a bit rate determination operation shown in FIG. 8 that will be described later.

The communication units 16_1 to 16_n transmit the media data received from the data allocation unit 13 to the reception apparatus 4 via the lines 3_1 to 3_n (Step S1104).

The transmission apparatus 2 determines whether transmission of all the pieces of media data has been completed after the processing from the above Steps S1101 to S1104 (Step S1105).

When the transmission of all the media data has been completed (YES in Step S1105), the transmission apparatus 2 ends all the processing. On the other hand, when the transmission of all the media data has not yet been completed (NO in Step S1105), the process goes back to Step S1101, where the transmission apparatus 2 performs processing from Step S1101 to Step S1104 again. When, for example, the media data to be distributed is a video image and 30 frames are input, if the transmission apparatus 2 has not completed processing of distributing the video data of 30 frames (NO in Step S1105), the processing of Steps S1101 to S1104 is repeatedly executed. On the other hand, when the transmission apparatus 2 has completed processing of distributing the video data of 30 frames (YES in Step S1105), the distribution processing is ended.

Referring next to FIG. 8, one example of the bit rate determination operation according to this example embodiment will be explained. The bit rate determination operation is performed independently from the operation described with reference to FIG. 7. The bit rate determination operation may be executed, for example, when the transmission apparatus 2 is started or may be executed at a certain cycle (e.g., for every one second). Alternatively, the bit rate determination operation may be executed when the communication units 16_1 to 16_n have detected that one of the communication qualities of the lines 3_1 to 3_n has been greatly changed. Alternatively, the bit rate determination operation may be executed when the transmission apparatus 2 is started, may be executed at a certain cycle, and may be additionally executed when the communication units 16_1 to 16_n have detected that one of the communication qualities of the lines 3_1 to 3_n has been greatly changed.

The communication units 16_1 to 16_n acquire information on the connecting lines 3_1 to 3_n, and the communication quality estimation unit 11 estimates the communication qualities of the respective lines 3_1 to 3_n based on the information from the communication units 16_1 to 16_n (Step S1201).

The bit rate determination unit 12 determines the bit rate of the optimal media data based on the communication quality estimated by the communication quality estimation unit 11 (Step S1202). Specifically, the bit rate determination unit 12 classifies the lines 3_1 to 3_n into the main lines and the sub lines by executing an operation of classifying the lines into the main lines and the sub lines that will be described later with reference to FIG. 9. Then the bit rate determination unit 12 determines the total value of the available bandwidth of all the lines that have been classified into the main lines of the lines 3_1 to 3_n as the bit rate of the media data. Alternatively, the bit rate determination unit 12 may determine a value obtained by multiplying the total value of the available bandwidth of all the lines that have been classified into the main lines by a predetermined coefficient such as, for example, 0.9, to be the bit rate of the media data.

The data allocation unit 13 determines the amount of the media data to be allocated to the respective lines 3_1 to 3_n based on the bit rate of the media data regarding which a notification has been sent from the bit rate determination unit 12 and the communication qualities of the respective lines 3_1 to 3_n regarding which a notification has been sent from the communication quality estimation unit 11 (Step S1203). Specifically, when the communication qualities of the respective lines 3 regarding which a notification has been sent from the communication quality estimation unit 11 are, for example, the available bandwidth of the respective lines 3, the data allocation unit 13 determines the data amount of the media data to be distributed to the respective lines 3 included in the main lines classified by the bit rate determination unit 12 in such a way that the ratio of the available bandwidth of the respective lines 3 matches the ratio of the data amount of the media data to be transmitted to the respective lines 3.

With reference next to FIG. 9, one example of an operation of classifying the lines into the main lines and the sub lines according to this example embodiment will be explained. It can be said that the operation shown in FIG. 9 is a detailed operation of Steps S1202 and S1203 of the operation shown in FIG. 8. The operation of classifying the lines into the main lines and the sub lines shown in FIG. 9 is performed by the bit rate determination unit 12. In the description of FIG. 9, the available bandwidth of the line 3_i (i=1, . . . , n) is denoted by bi. Further, in the operational example shown in FIG. 9, it is assumed that b1≥b2≥ . . . ≥bn for the sake of convenience. That is, a description will be given assuming that the available bandwidth of the respective lines 3 satisfy line 3_1≥line 3_2≥ . . . ≥line 3_n.

First, the lines 3_1 to 3_n are arranged in a descending order of the available bandwidth (Step S1301). Specifically, as shown in FIG. 9, the lines 3_1 to 3_n are arranged in a descending order of the available bandwidth b1 to bn, which results in b1≥b2≥ . . . ≥bn.

Next, the line whose available bandwidth is the largest is classified into the main line (Step S1302). In one example shown in FIG. 9, since the available bandwidth b1 of the line 3_1 is the largest, the line 3_1 is classified into the main line.

Next, for the line x (x is an integer that satisfies x≥2), the following processing is performed in order (Step S1303 to Step S1309). Specifically, x is determined (Step S1303), and Q(x−1), which is the QoE when the media data is allocated to the respective lines 3_1 to 3_x−1 (when the video bit rate is set to b1+b2+ . . . +bx−1), is calculated (Step S1304). Next, Q(x) when the media data is allocated to the respective lines 3_1 to 3_x (that is, the line 3_x is added to Q(x−1) obtained in Step S1304) is calculated (Step S1305).

Next, the improved value of the QoE after the line 3_x is added is calculated, and it is determined whether the improved value of the QoE that has been calculated is equal to or larger than a predetermined threshold Qth (Step S1306). Specifically, the improved value of the QoE is calculated from Q(x)−Q(x−1), and it is determined whether this calculated value is equal to or larger than the predetermined threshold Qth.

When the improved value of the QoE is equal to or larger than the predetermined threshold Qth (YES in Step S1306), the line 3_x is classified into the main line (Step S1307). Then x is incremented, that is, x is changed to x+1 (Step S1309), and then the process goes back to Step S1303. In the following operation, the aforementioned processing is performed until similar processing is performed for all the lines 3_1 to 3_n or NO is selected in Step S1306.

On the other hand, when the improved value of the QoE is smaller than the predetermined threshold Qth (NO in Step S1306), the line 3_x is classified into the sub line (Step S1308), and the process loop from Steps S1303 to S1309 is exited. The line 3_x+1 and the following lines (that is, line 3_x+1 to line 3_n) are classified into the sub lines (Step S1310), and this operation is ended.

In Step S1301 of the above operations, the lines 3 are re-arranged in a descending order of the available bandwidth. This is because the improved value of the QoE becomes high when the lines whose available bandwidth are larger are classified into the main lines. It can therefore be said that the above operation is a suitable operation. However, this is merely an example. In Step S1301 of the above operation, the lines 3 may not be arranged in a descending order of the available bandwidth, and all the lines 3 may be classified into the main lines or the sub lines.

With reference now to FIG. 5, a specific example of the above operations will be explained. As a premise, the number of lines connected to the transmission apparatus 2 is three (lines 3_1 to 3_3), the available bandwidth of the line 3_1 is 1000 kbps, the available bandwidth of the line 3_2 is 600 kbps, and the available bandwidth of the line 3_3 is 300 kbps. Further, it is assumed that the predetermined threshold Qth used in the determination in Step S1306 is 0.1.

First, the lines are arranged in a descending order of the available bandwidth (Step S1301). As a result, the line 3_1, the line 3_2, and the line 3_3 are arranged in this order. Next, the line whose available bandwidth is the largest is classified into the main line (Step S1302). Specifically, since the available bandwidth of the line 3_1 is the largest, the line 3_1 is classified into the main line.

Next, the operations from Steps S1304 to S1309 are performed for the line 3_2, which is the line whose available bandwidth is the second largest after the line 3_1 (i.e., x=2) (Step S1303). When Q(1) is calculated (Step S1304), Q(1) is 3.93, as shown in FIG. 5. Next, when Q(2) is calculated (Step S1304), Q(2) is 4.27, as shown in FIG. 5.

Next, Q(2)−Q(1) is calculated, and it is determined whether the calculated value is equal to or larger than the predetermined threshold Qth (Step S1305). Since Q(2)−Q(1)=0.34, which is equal to or larger than 0.1, which is the predetermined threshold Qth (YES in Step S1306), the line 3_2 is classified into the main line as well (Step S1307).

Next, as x=3 (Step S1309), a similar operation is performed on the line 3_3 as well. Then, as shown in FIG. 5, since Q(3) of the line 3_3 is 4.34 and Q(2) is 4.27, Q(3)−Q(2) becomes 0.07, which is smaller than 0.1, which is the predetermined threshold Qth (NO in Step S1306). Therefore, the line 3_3 is classified into the sub line (Step S1308). When classification of all the lines 3_1 to 3_3 into the main lines and the sub lines is completed, the bit rate determination unit 12 determines the bit rate to be 1600 kbps, which is the total value of the available bandwidth of the lines 3_1 and 3_2, which are the main lines.

As described above, in this example embodiment, when the media data is transmitted from the transmission apparatus 2 to the reception apparatus 4 via the plurality of lines 3, the communication quality estimation unit 11 estimates the communication qualities of the respective lines 3. The bit rate determination unit 12 classifies the respective lines 3 into the main lines that mainly perform transmission of the media data and the sub lines that auxiliarily perform this transmission from the communication qualities of the respective lines 3 using the QoE. Then the bit rate determination unit 12 determines the bit rate of the media data to be distributed based on the communication qualities (available bandwidth) of the lines classified into the main lines. The allocation unit 13 determines the amount of the media data to be allocated to the respective lines classified into the main lines in such a way that the transmission delay becomes a minimum, that is, the QoE becomes high. Therefore, with the transmission apparatus 2 according to this example embodiment, it becomes possible to determine the main lines that mainly perform transmission of the media data in view of the QoE. Further, the data allocation unit 13 allocates the media data in view of the available bandwidth to the respective lines classified into the main lines. That is, the data amount of the media data to be distributed to the line whose available bandwidth is large is made large and the data amount of the media data to be distributed to the line whose available bandwidth is small is made small. Therefore, with the transmission apparatus 2 according to this example embodiment, it becomes possible to prevent the media quality from being degraded when the communication quality is reduced sharply while satisfying a high QoE. In other words, it becomes possible to perform media distribution with a high quality of user experience.

Further, the media distribution system according to this example embodiment is, as described above, a system including the transmission apparatus 2 that performs media distribution with a high quality of user experience. Accordingly, media distribution with a high quality of user experience can be performed in the media distribution system according to this example embodiment as well.

MODIFIED EXAMPLE

The media distribution system 100 according to the first example embodiment may be modified as follows.

<1> In the aforementioned description, each of the transmission apparatus 2 and the reception apparatus 4 is connected to the plurality of lines 3_1 to 3_n. However, the present disclosure is not limited to this example, and the aspect of the lines 3 may be different from the one described above, as shown in FIG. 10.

Figure 10:
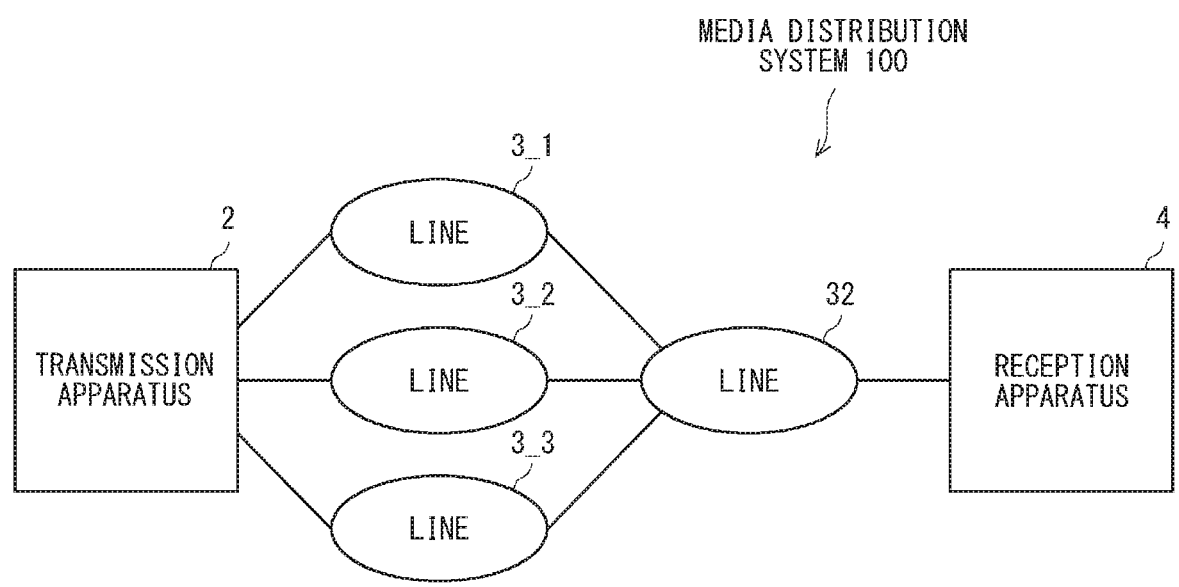
FIG. 10 is a schematic view of a media distribution system according to a modified example of the first example embodiment.

FIG. 10 is a schematic view of the media distribution system 100 according to a modified example of the first example embodiment. As shown in FIG. 10, the transmission apparatus 2 may be connected to the plurality of lines 3, the plurality of lines 3 may be aggregated between the transmission apparatus 2 and the reception apparatus 4, and the reception apparatus 4 may be connected to a single line 32. Alternatively, the transmission apparatus 2 may be configured to be connected to a single line and the reception apparatus 4 may be connected to a plurality of lines. As described above, in the media distribution system 100 according to the first example embodiment, a plurality of lines 3 to be connected to the transmission apparatus 2 may be provided. That is, a plurality of logical lines that connect the transmission apparatus 2 and the reception apparatus 4 may be provided. When the transmission apparatus 2 is connected to a single line, the communication unit 16 may be a single communication unit or may be a plurality of communication units that correspond to a plurality of logical lines. When the communication unit 16 is a single communication unit, information related to the communication qualities of the plurality of lines is acquired.

<2> Further, in the above description, the data allocation unit 13 of the transmission apparatus 2 allocates the frame data of the video data in such a way that the ratio of the data amount of the frame data of the video data to be transmitted matches the ratio of the available bandwidth of the respective lines 3_1 to 3_n as a method of minimizing the reproduction delay. However, the present disclosure is not limited to the above case, and the allocation of the media data may be performed in view of an amount of untransmitted data accumulated in the transmission buffer of each line 3. Specifically, in general, the communication unit 16 may not be able to immediately transmit the data received from the data allocation unit 13, and has a transmission buffer for temporarily storing data before it is sent to the line 3. Further, in a similar way, data buffered also in a communication apparatus such as a router (not shown) included in each line 3 is present. That is, the amount of data buffered in each line 3 and the amount of data buffered in the communication unit 16 exist.

In view of the above situation, the data allocation unit 13 may allocate the data amount of the media data to the respective lines classified into the main lines in such a way that the ratio of the available bandwidth of the respective lines classified into the main lines matches the ratio of the total value of the allocated data amount of the media data when it is allocated to the respective lines classified into the main lines and the data amount buffered in the line and a communication unit connected to the line. The allocated data amount means a data amount that is predicted when the media data is allocated to the respective lines classified into the main lines.

With reference to FIG. 11, one example of data allocation according to a modified example of the first example embodiment will be explained. FIG. 11 is a diagram for explaining one example of data allocation according to a modified example of the first example embodiment. FIG. 11 shows, from the left to the right, the line number, the available bandwidth of the respective lines, the buffering data amount of each line, the allocated data amount when the media data is allocated to the respective lines, and the transmission data amount. Here, the buffering data amount is a total value of the data amount buffered in the respective lines and communication units connected to the respective lines. Further, the allocated data amount is a data amount that is predicted when the media data is allocated to the respective lines classified into the main lines, and the transmission data amount is a total data amount of the buffering data amount and the allocated data amount.

As shown in FIG. 11, it is assumed that, for example, the transmission apparatus 2 is connected to the lines 3_1 to 3_3, and the lines 3_1 and 3_2 are classified into the main lines. It is further assumed that the available bandwidth of the line 3_1 is 1000 kbps, the available bandwidth of the line 3_2 is 600 kbps, the buffering data amount buffered in the line 3_2 and the communication unit 16_2 is 2000 bytes, and the video frame that the transmission apparatus 2 transmits is 32000 bytes. In the example shown in FIG. 11, if 21250 bytes are allocated to the line 3_1 and 10750 bytes are allocated to the line 3_2, the ratio of the transmission data amount in one line 3 to that in the other line 3 becomes 5:3. That is, since the ratio of the transmission data amount in one line 3 to that in the other line 3 becomes the same as the ratio of the available bandwidth of the line 3_1 to that of the line 3_2, the data allocation unit 13 additionally assigns the allocated data amount to the respective lines 3. According to this procedure, the transmission from the lines 3_1 and 3_2 is concurrently completed, including the buffering data amount, and the transmission delay becomes a minimum. That is, the reproduction delay becomes a minimum, and an effect similar to that obtained in the first example embodiment can be obtained.

Second Example Embodiment

Next, a second example embodiment will be explained. The second example embodiment is a modified example of the first example embodiment. The configuration of the data allocation unit 13 of the transmission apparatus 2 according to the second example embodiment is different from that of the first example embodiment. Since the configurations other than that of the data allocation unit 13 are similar to those of the first example embodiment, descriptions of the respective configurations will be omitted.

The data allocation unit 13 according to the first example embodiment has a configuration that it does not transmit the media data to the sub lines. On the other hand, in this example embodiment, the data allocation unit 13 transmits, via one or more lines classified into the sub lines, a part of the media data of the data to be transmitted via the main lines in a duplicate way. In other words, the data allocation unit 13 has a configuration that it allocates the media data not only to the main lines but also to one or more lines classified into the sub lines. Further, the data allocation unit 13 transmits a part of the media data transmitted from each of the lines classified into the main lines via the sub lines in an order different from the order in which the media data is transmitted via the main lines.

Figure 12:
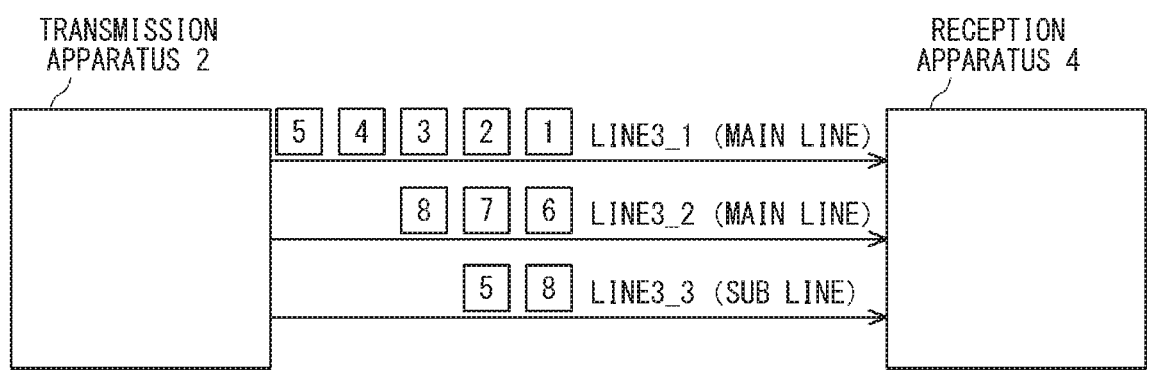
FIG. 12 is a diagram for explaining one example of an operation of transmitting media data according to a second example embodiment.

With reference to FIG. 12, a specific example of allocation of the media data performed by the data allocation unit 13 will be explained. FIG. 12 is a diagram explaining one example of an operation of transmitting the media data according to the second example embodiment. In the example shown in FIG. 12, lines between the transmission apparatus 2 and the reception apparatus 4 are three lines from the lines 3_1 to 3_3, the lines 3_1 and 3_2 are classified into the main lines, and the line 3_3 is classified into the sub line. It is further assumed that the media data transmitted from the transmission apparatus 2 is video data, and one video frame is composed of eight packets from the sequence number 1 to the sequence number 8.

As shown in FIG. 12, the data allocation unit 13 allocates the media data in such a way that the packets whose sequence numbers are 1 to 5 are transmitted in the line 3_1 and the packets whose sequence numbers 6 to 8 are transmitted in the line 3_2. In this example embodiment, the data allocation unit 13 further allocates the media data in such a way that it is also transmitted through the line 3_3, which has been classified into the sub line, in the order from the last one of the packets transmitted in the lines 3_1 and 3_2, that is, in an order different from the one in which the packets are transmitted via the main lines. That is, the data allocation unit 13 allocates the media data in such a way that the packet of the sequence number 5, which is the last packet transmitted via the line 3_1, and the packet of the sequence number 8, which is the last packet transmitted via the line 3_2, will be transmitted from the line 3_3, which has been classified into the sub line.

While only the last one packet transmitted via each of the lines 3_1 and 3_2, which are the main lines, is transmitted from the line 3_3, which has been classified into the sub line in the example shown in FIG. 12, the present disclosure is not limited to this example, and the packet of the sequence number 4, which is the second to last packet transmitted via the line 3_1, may also be transmitted, for example, from the line 3_3. In this case, the packets may be transmitted in the order of the sequence numbers 8, 5, and 4 in the line 3_3.

Further, in a configuration in which there are two or more sub lines, some of the packets transmitted via the main line may be transmitted using all the lines classified into the sub lines, or some of the packets transmitted via the main line may be transmitted using some of the lines classified into the sub lines.

According to the aforementioned configuration, even when, for example, the available bandwidth of the main line is decreased sharply in a certain time zone and some of the packets that have been transmitted arrives in the reception apparatus 4 in a delayed manner, the packet transmitted in the sub line arrives in the reception apparatus 4, whereby the reception apparatus 4 is able to reproduce this video frame with less delay. That is, the data allocation unit 13 transmits some of the packets transmitted via the main line from the sub line in a duplicate way, whereby the delay until the video image is displayed is reduced. Therefore, with the transmission apparatus 2 according to this example embodiment, media distribution with higher quality of user experience can be performed compared to that in the first example embodiment. Further, with the media distribution system according to this example embodiment as well, media distribution with higher quality of user experience can be performed compared to that in the first example embodiment.

MODIFIED EXAMPLE

The transmission apparatus 2 according to the second example embodiment may be modified as follows.

In the aforementioned description, the data allocation unit 13 of the transmission apparatus 2 may use redundant data of the media data transmitted via the main lines as the media data transmitted via the sub lines. The redundant data means media data that has been transmitted from the transmission apparatus 2 but has been lost without reaching the reception apparatus 4 among the media data that has been transmitted from the transmission apparatus 2.

Figure 13:
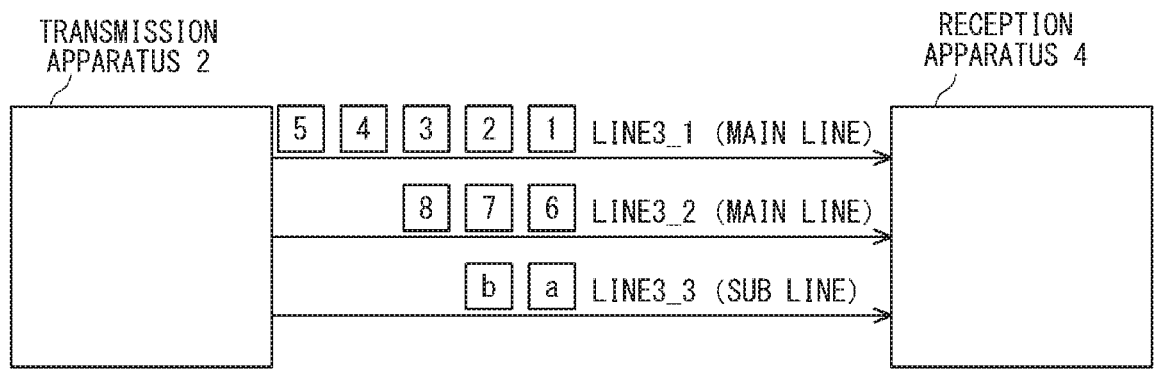
FIG. 13 is a diagram for explaining one example of the operation of transmitting the media data according to a modified example of the second example embodiment.

FIG. 13 is a diagram for explaining one example of an operation of transmitting the media data according to the modified example of the second example embodiment. In the example shown in FIG. 13, packets a and b transmitted in the line 3_3 are redundant packets. That is, they are packets that have been lost without reaching the reception apparatus 4 among the packets from the sequence number 1 to the sequence number 8 transmitted via the lines 3_1 and 3_2.

As described above, the data allocation unit 13 transmits the redundant packet and the reception apparatus 4 combines the packet that has already been received and the redundant packet transmitted via the sub line, whereby it is possible to restore the lost packet. That is, according to the above configuration, even when, for example, the packet that has been transmitted is lost due to a transmission error or the like of the main lines, it is possible to receive the redundant packet transmitted through the sub line and to recover the lost packet, whereby it becomes possible to prevent the media quality from being degraded.

Further, the data allocation unit 13 transmits the redundant data via the sub line, whereby it becomes possible to estimate the available bandwidth of the sub line. Therefore, when the available bandwidth of the sub line increases in a certain time zone and it has been determined that the QoE will be improved by switching the sub lines to the main lines by the bit rate determination unit 12, the sub lines can be immediately switched to the main lines. Therefore, according to the aforementioned configuration, effects similar to those obtained in the second example embodiment can be obtained.

Third Example Embodiment

Next, a third example embodiment will be explained. The third example embodiment is a modified example of the first example embodiment. In this example embodiment, configurations of the communication quality estimation unit 11 and the data allocation unit 13 of the transmission apparatus 2 are different from those of the first example embodiment. Since the configurations other than those of the communication quality estimation unit 11 and the data allocation unit 13 are similar to those in the first example embodiment, descriptions of the respective configurations will be omitted.

The configuration of the transmission apparatus 2 according to this example embodiment will be explained.

The communication quality estimation unit 11 estimates (predicts) probability distribution of the available bandwidth of the respective lines 3. In the first example embodiment, the communication quality estimation unit 11 has estimated the available bandwidth of the respective lines 3 based on the information from the communication unit 16. In the first example embodiment, the information acquired by the communication unit 16 is a definitive value. Therefore, the communication quality estimation unit 11 has estimated the communication qualities of the respective lines 3 using the definitive value. On the other hand, in this example embodiment, the communication quality estimation unit 11 is configured to estimate (predict) the probability distribution of the available bandwidth of the respective lines 3.

Figure 14:
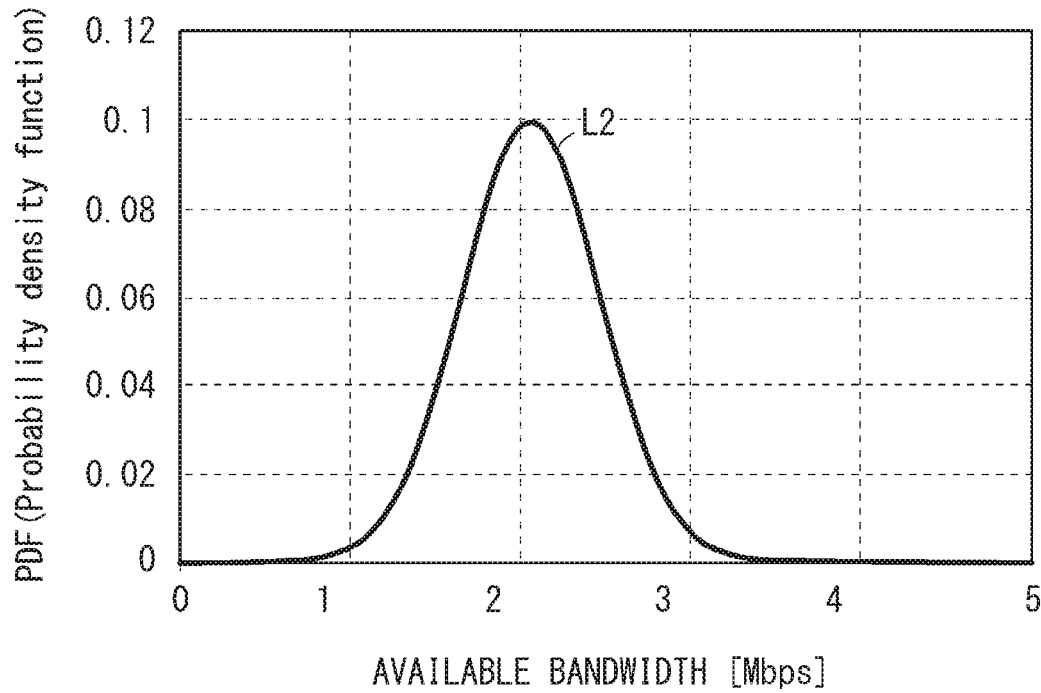
FIG. 14 is a diagram showing one example of probability distribution of an available bandwidth for each line.

With reference now to FIG. 14, the probability distribution of the available bandwidth of the respective lines 3, the probability distribution being estimated by the communication quality estimation unit 11, will be explained. FIG. 14 is a diagram showing one example of the probability distribution of the available bandwidth with respect to the respective lines 3. The horizontal axis shown in FIG. 14 indicates the available bandwidth of one of the lines 3, and the vertical axis indicates the probability density. It is known that the future probability distribution of the rate of the communication line of each line 3 will become a normal distribution having a certain available bandwidth as an average value, like the curved line L2. The communication quality estimation unit 11 estimates the probability distribution of the available bandwidth of the respective lines 3, that is, the curved line L2 in FIG. 14 based on the information from the communication unit 16.

The data allocation unit 13 determines allocation of the data amount of the media data to be transmitted based on the probability distribution of the available bandwidth of the respective lines 3 estimated by the communication quality estimation unit 11. In the first example embodiment, the data allocation unit 13 allocates the data amount of the media data to be transmitted in accordance with the ratio of the data amount of the respective lines classified into the main lines. On the other hand, in this example embodiment, the data amount of the media data to be transmitted is configured to be assigned to the main lines based on the probability distribution of the available bandwidth of the respective lines 3 estimated by the communication quality estimation unit 11.

As described above, as the transmission delay of the media data transmitted from the transmission apparatus 2 becomes smaller, that is, as the reproduction delay becomes smaller, the QoE increases. In this example embodiment, the data allocation unit 13 allocates the media data to the respective lines classified as the main lines in such a way that the expected value of the transmission delay becomes a minimum based on the probability distribution of the available bandwidth of the respective lines 3 estimated by the communication quality estimation unit 11.

Figure 15:
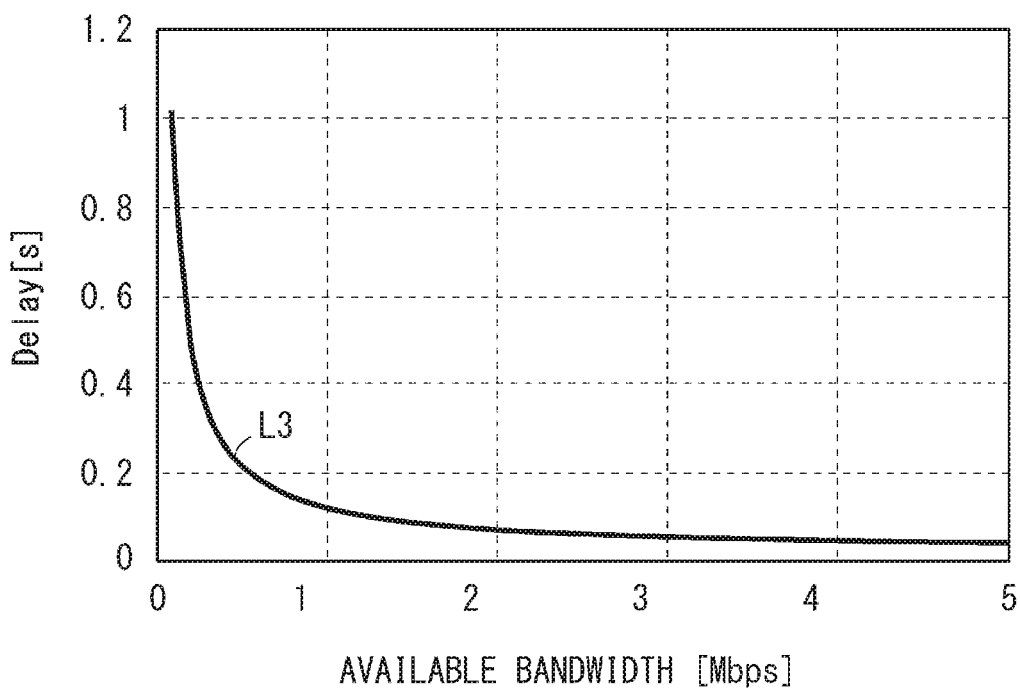
FIG. 15 is a diagram showing a relation between an available bandwidth and a transmission delay.
Figure 16:
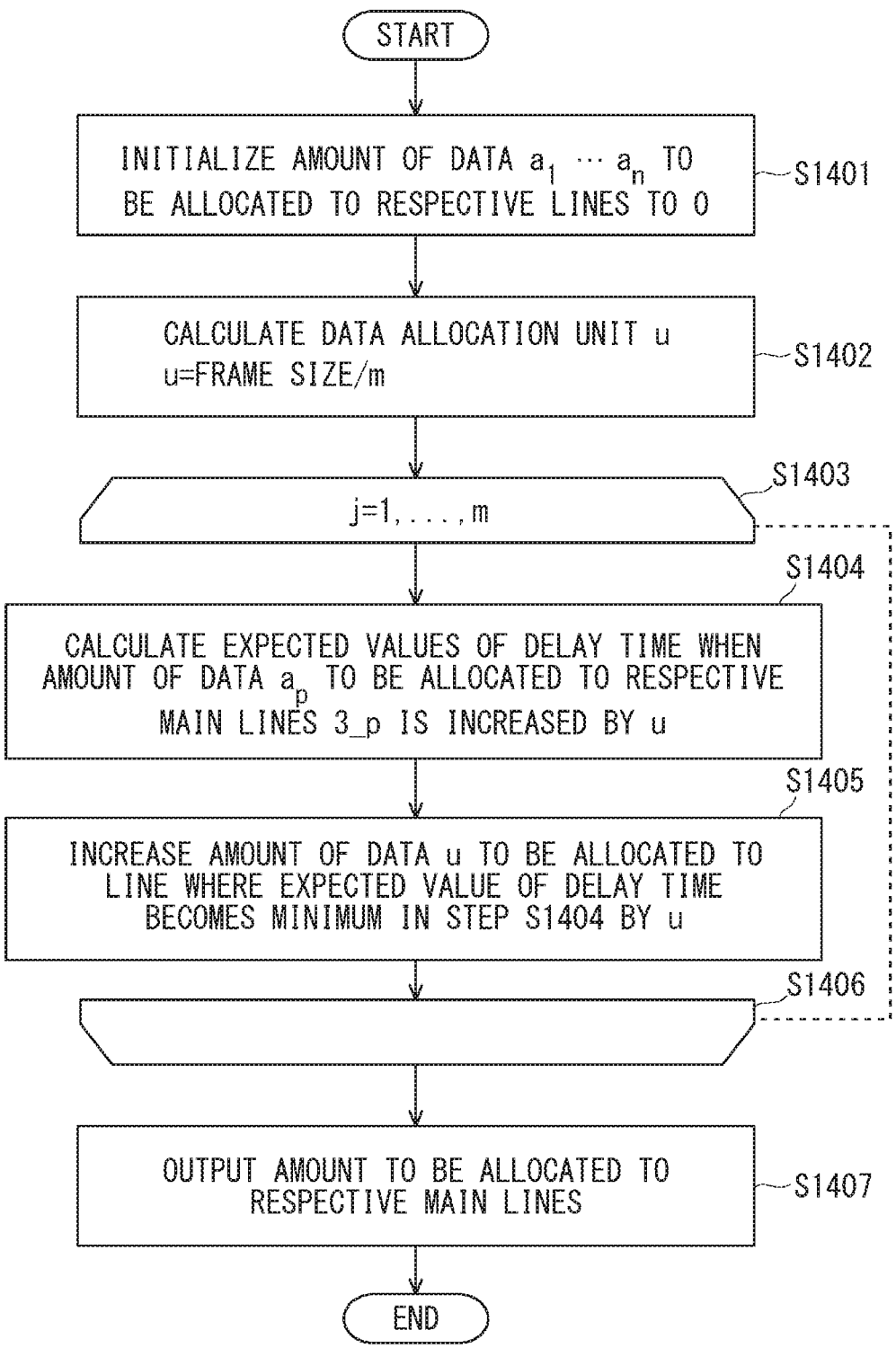
FIG. 16 is a flowchart for determining a data amount of media data allocated to the respective lines classified into the main lines.

Next, with reference to FIGS. 14 to 16, a method of allocating the media data by the data allocation unit 13 will be explained. FIG. 15 is a diagram showing a relation between the available bandwidth and the transmission delay. FIG. 16 is a flowchart for determining the amount of the media data to be allocated to the respective lines classified into the main lines.

FIG. 15 is a diagram showing a relation between the rate of the communication line and the delay time of this line when the size of the media data (e.g., video frame) is 12.5 KBytes. In FIG. 15, the horizontal axis indicates the available bandwidth and the vertical axis indicates the delay time required for the transmission of the video frame. The relation between the available bandwidth of the respective lines 3 and the delay time is a relation that is inversely proportional to each other, as shown in the curved line L3 in FIG. 15. In FIGS. 14 and 15, they use the same line. That is, by using FIGS. 14 and 15, the relation among the available bandwidth, the probability density, and the delay time can be obtained. Here, the delay time is the sum of the transmission delay that is required to perform transmission in the line 3 from the transmission apparatus 2 to the reception apparatus 4, and the queuing delay, which corresponds to a waiting time for transmission in a queue of a communication apparatus such as a router or the like that is included in the transmission apparatus 2 or the line 3. In the example shown in FIG. 15, the transmission delay is set to be 0.02 seconds, which is calculated from the frame size of the media data that transmits the queuing delay / available bandwidth.

When, for example, the lines classified into the main lines are lines 3_1 to 3_n, the probability that the available bandwidth of a line 3_p (p is any integer from 1 to n, and n is any integer equal to or larger than two) becomes c is denoted by f(c) in FIG. 14, and the delay time when the available bandwidth is c is denoted by d(c) in FIG. 15, the expected value $d_E(p)$ of the delay time of the line 3_p becomes the one shown by the following relational expression (1).

$$d_E(p) = \int_0^\infty d(c)f(c)dc \quad (1)$$

The data allocation unit 13 obtains a combination from $a_1$ to $a_n$ in which the video frame size when the amount of data to be allocated to the line 3_p is denoted by $a_p$ satisfies a relational expression (2) and a relational expression (3) becomes a minimum, whereby it is possible to perform allocation of the data amount of the media data in which the expected value of the delay time becomes a minimum.

$$\sum_{p=1}^{n} a_p = \text{video frame size} \quad (2)$$

$$\max_{p=1,\ldots,n} d_E(p) \quad (3)$$

The optimum solution of the above problem may be calculated by a full searching method in which the expected value of the delay time is calculated for all the combinations of $a_1$ to $a_n$ and the smallest one is selected, or $a_1$ to $a_n$ in which the expected value of the delay becomes a minimum may be obtained using an approximate solution method.

In this example embodiment, the method of using the approximate solution method in which a combination that is close to the optimum solution is obtained with a small amount of calculation is used in view of the amount of calculation. FIG. 16 is a flowchart for explaining one example of the approximate solution method in order to obtain the optimum solution of the above problem. In this approximate solution method, the amount of data to be allocated to the lines 3_1 to 3_n are determined by gradually increasing the data amount of the media data in such a way that the expected values of the delay time in the lines 3_1 to 3_n, which are the main lines, become equal to one another as much as possible.

First, the data allocation unit 13 initializes the amount of data to be allocated to the respective lines 3_1 to 3_n to 0 (Step S1401). Next, the data allocation unit 13 determines the data allocation unit u to be allocated to the lines 3_1 to 3_n (Step S1402). The data allocation unit u is a value obtained by equally dividing the frame size transmitted from the transmission apparatus 2 by m. As the value m is made larger, the expected values of the delay time in the lines 3_1 to 3_n become more equal to one another. On the other hand, as the value m is made larger, the amount of calculation for calculating the optimal data allocation amount to be allocated to the lines 3_1 to 3_n increases. Therefore, the values of the data allocation units u and m are selected as appropriate depending on the processing capability of the transmission apparatus 2. The symbol m may be set to, for example, an arbitrary value between 10 and 100.

The data allocation unit 13 equally divides the frame size, which is the data amount of the media data transmitted from the transmission apparatus 2, by m, and determines the amount of data to be allocated to the lines 3_1 to 3_n by m times of loop processing (Step S1403 to Step S1406). Specifically, first, the data allocation unit 13 sets j to be 1 in order to perform the first loop processing (Step S1403). The symbol j is an integer from 1 to m.

Next, expected values of the delay time when the amount of data to be allocated to the lines 3_1 to 3_n are increased from the current value by the data allocation unit u are calculated (Step S1404). Next, the data amount is allocated to one of the lines 3_1 to 3_n where the expected value of the delay time becomes a minimum in Step S1404 by the allocation unit u from the current value (the amount of data u to be allocated to this line is increased) (Step S1405). Next, j is increased by one in order to perform the next loop processing (Step S1406). In the following operation, the operations from Step S1403 to Step S1406 are executed until j becomes equal to m+1 in Step S1406.

When j becomes equal to m+1 in Step S1406, the process proceeds to Step S1407, where the data allocation unit 13 outputs the amount of data to be eventually allocated to the lines 3_1 to 3_n (Step S1407). Then the data allocation unit 13 allocates the determined allocation amount, that is, the data amount of the media data to the lines 3_1 to 3_n.

The effects of this example embodiment will be explained. In this example embodiment, the data allocation unit 13 allocates the data amount of the media data in such a way that the expected value of the delay time becomes a minimum based on the probability distribution of the available bandwidth predicted value. As shown in FIG. 15, since the delay time is inversely proportional to the available bandwidth, the delay is increased sharply when the available bandwidth is reduced. Therefore, in the probability distribution shown in FIG. 14, the expected value of the delay time increases in the line whose width of the probability density function is large, that is, in the line whose fluctuation in the available bandwidth is large. That is, in this line, the fluctuation in the available bandwidth is large, and the available bandwidth is reduced, which causes a large decrease in the QoE.

In order to deal with the above situation, in this example embodiment, the data allocation unit 13 determines the amount of data to be allocated to the respective lines classified into the main lines based on the expected values of the delay time, whereby the amount of data to be allocated to a line in which the fluctuation in the available bandwidth is large is reduced. Therefore, it is possible to prevent the delay from being increased even when the available bandwidth is reduced sharply, which results in an improvement of the QoE. That is, with the transmission apparatus 2 according to this example embodiment, it becomes possible to perform media distribution with a high quality of user experience. Further, with the media distribution system according to this example embodiment as well, it is possible to perform media distribution with a high quality of user experience.

MODIFIED EXAMPLES

The transmission apparatus 2 according to the third example embodiment may be modified as follows.

In the aforementioned description, the data allocation unit 13 assigns the data to the lines classified into the main lines. However, the data allocation unit 13 may allocate the data amount of the media data to be distributed to all the lines connected to the transmission apparatus 2 by the aforementioned method. With this configuration as well, effects similar to those described in the third example embodiment can be obtained.

Fourth Example Embodiment

Next, a fourth example embodiment will be explained. The configuration of the bit rate determination unit 12 according to the fourth example embodiment is different from those of the first to third example embodiments. Specifically, in this example embodiment, the operation of determining the bit rate performed by the bit rate determination unit 12 is different from that in the first to third example embodiments, and also the operation of Step S1202 in FIG. 8 is different.

Therefore, in this example embodiment, the configuration of the bit rate determination unit 12 will be explained and configurations other than that of the bit rate determination unit 12 will not be explained. The method in which the data allocation unit 13 allocates the media data to the respective lines may be any of the ones described in the first to third example embodiments.

In the first to third example embodiments, the bit rate determination unit 12 classifies the lines 3_1 to 3_n from the transmission apparatus 2 to the reception apparatus 4 into the main lines and the sub lines, and determines the total value of the available bandwidth of all the lines that have been classified into the main lines or a value obtained by multiplying this total value by a predetermined coefficient to be a bit rate. On the other hand, in this example embodiment, the bit rate determination unit 12 classifies all the lines 3_1 to 3_n into the main lines. Then the bit rate determination unit 12 determines the bit rate in which the MOS is reduced from the MOS that corresponds to the total value of the available bandwidth of all the lines 3_1 to 3_n by a specified value that is determined in advance to be the bit rate.

With reference to FIG. 17, a specific example of the bit rate determination operation by the bit rate determination unit 12 will be explained. FIG. 17 is a diagram for explaining the bit rate determination operation according to this example embodiment. FIG. 17 shows, from the left to the right, the total value of the available bandwidth of all the lines, the MOS that corresponds to the total value of the available bandwidth of all the lines, the bit rate selected (determined) by the bit rate determination unit 12, the MOS that corresponds to the bit rate selected (determined) by the bit rate determination unit 12, and the difference between the total value of the available bandwidth and the bit rate that has been determined.

Further, FIG. 17 shows, from the top to the bottom, the descriptions of the respective items, and four examples of the bit rate determination operation. That is, the lines from the second line to the bottom line in FIG. 17 show examples of cases in which the total values of the available bandwidth of all the lines are 200 kbps, 1000 kbps, 5000 kbps, and 20000 kbps. The MOS that corresponds to each bit rate is the MOS determined from the relationship diagram shown in FIG. 6.

As shown in FIG. 17, the bit rate determination unit 12 determines the bit rate that corresponds to the MOS that is reduced by a specified value that is determined in advance from the MOS that corresponds to the total value of the available bandwidth of all the lines 3_1 to 3_n. It is assumed, for example, that the total value of the available bandwidth of all the lines is 200 kbps and a specified value that is determined in advance is 0.1. In this case, the corresponding MOS is 2.01 from FIG. 6. Since the bit rate whose MOS becomes 1.91, which is the value reduced from 2.01 by 0.1, which is a specified value that is determined in advance, is 180 kbps from FIG. 6, the bit rate determination unit 12 determines that the bit rate of the media data is 180 kbps.

Further, in the cases where the total values of the available bandwidth of all the lines are 1000 kbps, 5000 kbps, and 20000 kbps as well, the bit rates are determined to be the ones that are reduced from the corresponding MOS by 0.1, which is a specified value that is determined in advance, that is, 910 kbps, 2700 kbps, and 4600 kbps as the bit rates of the media data.

In FIG. 17, the rightmost column indicates the difference between the total value of the available bandwidth and the bit rate that has been determined. The difference between the total value of the available bandwidth and the bit rate that has been determined becomes larger in the lower stage of FIG. 17. When the total value of the available bandwidth (bit rate) of all the lines is small, the MOS is greatly reduced if the bit rate determined by the bit rate determination unit 12 is reduced. Therefore, the bit rate that is close to the total value of the available bandwidth of all the lines is selected. On the other hand, when the total value of the available bandwidth (bit rate) of all the lines is large, even when the bit rate determined by the bit rate determination unit 12 is reduced, the value of the MOS is not reduced much. Therefore, the bit rate determination unit 12 reduces the bit rate to be determined to minimize the influence even when the available bandwidth is reduced. That is, the bit rate determination unit 12 is able to determine the bit rate of the media data in view of both the reduction in the MOS due to the decrease in the bit rate and the reduction in the MOS due to the decrease in the available bandwidth.

Next, effects of this example embodiment will be explained. As described above, in this example embodiment, the bit rate determination unit 12 determines the bit rate of the media data to be transmitted in view of both the reduction in the MOS due to the decrease in the bit rate and the reduction in the MOS due to the decrease in the available bandwidth. Therefore, with the transmission apparatus 2 according to this example embodiment, it is possible to eventually improve the QoE and to perform the media distribution with a high quality of user experience. Further, with the media distribution system according to this example embodiment as well, it is possible to perform the media distribution with a high quality of user experience.

Other Example Embodiments

Figure 18:
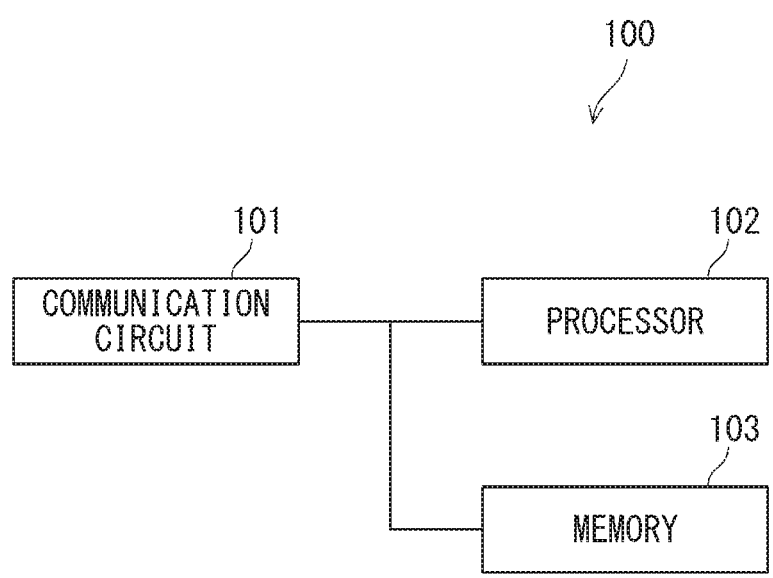
FIG. 18 is a block diagram illustrating a hardware configuration of a computer (an information processing apparatus) capable of achieving a communication apparatus or a transmission apparatus according to each example embodiment of the present disclosure.

The communication apparatus 1 in the outline of the above example embodiments and the transmission apparatus 2 according to the first to fourth example embodiments may each include the following hardware configuration. FIG. 18 is a block diagram illustrating a hardware configuration of a computer (information processing apparatus) capable of achieving the communication apparatus 1 or the transmission apparatus 2 according to each of the example embodiments of the present disclosure.

As shown in FIG. 18, the communication apparatus 1 and the transmission apparatus 2 include a communication circuit 101, a processor 102, and a memory 103.

The communication quality estimation unit 11, the bit rate determination unit 12, and the data allocation unit 13 of the communication apparatus 1 described in the outline of the example embodiments are achieved by the processor 102 loading a program stored in the memory 103 and executing the loaded program. The communication quality estimation unit 11 may be achieved by the communication circuit 101.

Further, the communication units 16_1 to 16_n of the transmission apparatus 2 described in the first to fourth example embodiments are implemented by the communication circuit 101. Further, the communication quality estimation unit 11, the bit rate determination unit 12, the data allocation unit 13, the data input unit 14, and the encoding unit 15 of the transmission apparatus 2 described in the first to fourth example embodiments are achieved by the processor 102 loading a program stored in the memory 103 and executing the loaded program. The communication quality estimation unit 11 may be achieved by the communication circuit 101.

While the present disclosure has been described with reference to the example embodiments, the present disclosure is not limited to the aforementioned example embodiments. Various changes that can be understood by those skilled in the art can be made to the configurations and the details of the present disclosure within the scope of the present disclosure.

Further, arbitrary processing of the aforementioned communication apparatus 1 and transmission apparatus 2 may be achieved by causing a Central Processing Unit (CPU) to execute a computer program. In this case, the computer program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). Further, the program(s) may be provided to a computer using any type of transitory computer readable media. Examples of transitory computer readable media include electric signals, optical signals, and electromagnetic waves. Transitory computer readable media can provide the program to the computer via a wired communication line (e.g., electric wires, and optical fibers) or a wireless communication line.

Further, the example embodiments of the present disclosure include, besides a case in which the functions of the aforementioned example embodiments are achieved by a computer executing a program implementing the functions of the aforementioned example embodiments, a case in which this program implements the functions of the aforementioned example embodiments in collaboration with an Operating System (OS) or an application software operating on the computer. The example embodiments of the present disclosure also include a case in which a part or all of the processing of this program is performed by a function expansion board provided in a computer or a function expansion unit connected to a computer and thus the functions of the aforementioned example embodiments are achieved.

For example, the whole or part of the above embodiments can be described as, but not limited to, the following supplementary notes.

(Supplementary Note 1)

A communication apparatus configured to distribute media data to another communication apparatus via a plurality of lines, the communication apparatus comprising:

a communication quality estimation unit configured to estimate communication qualities of the respective lines;

a bit rate determination unit configured to calculate, from the estimated communication qualities of the respective lines, an index value indicating a quality of user experience when each of the lines is used and determine a bit rate of the media data based on the calculated index value; and a data allocation unit configured to allocate a data amount of the media data to the respective lines based on the estimated communication qualities of the respective lines and the bit rate that has been determined.

(Supplementary Note 2)

The communication apparatus according to Supplementary Note 1, wherein the communication quality is a communication rate, and the bit rate determination unit classifies the respective lines into main lines that mainly perform transmission of the media data and sub lines that auxiliarily perform transmission of the media data based on the calculated index value, and determines a total value of the communication rates of all the lines that have been classified into the main lines or a value obtained by multiplying the total value by a predetermined coefficient to be the bit rate of the media data.

(Supplementary Note 3)

The communication apparatus according to Supplementary Note 2, wherein the bit rate determination unit calculates, for each of the lines, an improved value of the index value when this line is used, classifies the line into a main line when the calculated improved value of the index value is equal to or larger than a predetermined threshold, and classifies the line into a sub line when the calculated improved value of the index value is smaller than the predetermined threshold.

(Supplementary Note 4)

The communication apparatus according to Supplementary Note 2 or 3, wherein the data allocation unit allocates the data amount of the media data to the respective lines that have been classified into the main lines in accordance with a ratio of the communication rates of the respective lines that have been classified into the main lines.

(Supplementary Note 5)

The communication apparatus according to any one of Supplementary Notes 2 to 4, further comprising:

at least one communication unit that corresponds to the respective lines, wherein the data allocation unit allocates the data amount of the media data to the respective lines that have been classified into the main lines in such a way that the ratio of the communication rates of the respective lines that have been classified into the main lines matches the ratio of the total value of the data amount of the media data when the media data is allocated to the respective lines that have been classified into the main lines and a data amount buffered in the line and a communication unit connected to the line.

(Supplementary Note 6)

The communication apparatus according to any one of Supplementary Notes 2 to 5, wherein the data allocation unit transmits a part of the media data transmitted from the main lines via at least one line classified into the sub lines in a duplicate way.

(Supplementary Note 7)

The communication apparatus according to any one of Supplementary Notes 1 to 3, and 6, wherein the communication quality estimation unit estimates probability distribution of communication rates of the respective lines, and the data allocation unit allocates the data amount of the media data to the respective lines in such a way that an expected value of the delay time calculated from the probability distribution of the communication rate of the each line becomes a minimum.

(Supplementary Note 8)

The communication apparatus according to any one of Supplementary Notes 1, 4, and 5, wherein the communication quality estimation unit estimates the communication rates of the respective lines, and the bit rate determination unit classifies the respective lines into main lines, calculates the index value from a total value of the communication rates of the respective lines, and determines a bit rate that corresponds to an index value that is reduced from the calculated index value by a specified value set in advance to be the bit rate of the media data.

(Supplementary Note 9)

A media distribution system comprising a transmission apparatus and a reception apparatus, the media distribution system distributing media data from the transmission apparatus to the reception apparatus via a plurality of lines, wherein the transmission apparatus comprises:

a communication quality estimation unit configured to estimate communication qualities of the respective lines;

a bit rate determination unit configured to calculate, from the estimated communication qualities of the respective lines, an index value indicating a quality of user experience when each of the lines is used and determine a bit rate of the media data based on the calculated index value; and a data allocation unit configured to allocate a data amount of the media data to the respective lines based on the estimated communication qualities of the respective lines and the bit rate that has been determined.

(Supplementary Note 10)

A media distribution method for distributing media data to another communication apparatus via a plurality of lines, the method comprising:

estimating communication qualities of the respective lines;

calculating, from the estimated communication qualities of the respective lines, an index value indicating a quality of user experience when each of the lines is used and determining a bit rate of the media data based on the calculated index value; and allocating a data amount of the media data to the respective lines based on the estimated communication qualities of the respective lines and the bit rate that has been determined.

(Supplementary Note 11)

The communication apparatus according to Supplementary Note 6, wherein the data allocation unit transmits a part of the media data to at least one line classified into the sub lines in an order that is different from the order in which the media data transmitted from the main line is transmitted.

(Supplementary Note 12)

A media distribution program for distributing media data to another communication apparatus via a plurality of lines, the program causing a computer to execute the following steps of:

estimating communication qualities of the respective lines;

calculating, from the estimated communication qualities of the respective lines, an index value indicating a quality of user experience when each of the lines is used and determining a bit rate of the media data based on the calculated index value; and allocating a data amount of the media data to the respective lines based on the estimated communication qualities of the respective lines and the bit rate that has been determined.

REFERENCE SIGNS LIST

1 COMMUNICATION APPARATUS
2 TRANSMISSION APPARATUS
3_1 to 3_n, 32 LINE
4 RECEPTION APPARATUS
11 COMMUNICATION QUALITY ESTIMATION UNIT
12 BIT RATE DETERMINATION UNIT
13 DATA ALLOCATION UNIT
14 DATA INPUT UNIT
15 ENCODING UNIT
16_1 to 16_n COMMUNICATION UNIT
100 MEDIA DISTRIBUTION SYSTEM

The invention claimed is:

1. A communication apparatus comprising:
at least one memory storing instructions; and
at least one processor configured to execute the instructions to:
  estimate communication qualities of a plurality of respective lines that distribute media data to another communication apparatus;
  calculate, from the estimated communication qualities of the respective lines, an index value indicating a quality of user experience when each of the lines is used and determine a bit rate of the media data based on the calculated index value; and
  allocate a data amount of the media data to the respective lines based on the estimated communication qualities of the respective lines and the bit rate that has been determined,
wherein the communication quality is a communication rate, and
wherein the at least one processor is further configured to the instructions to:
  classify the respective lines into main lines that mainly perform transmission of the media data and sub lines that auxiliarily perform transmission of the media data based on the calculated index value; and
  determine a total value of the communication rates of all the lines that have been classified into the main lines or a value obtained by multiplying the total value by a predetermined coefficient to be the bit rate of the media data.

2. The communication apparatus according to claim 1, wherein the at least one processor is further configured to execute the instructions to:
  calculate, for each of the lines, an improved value of the index value when this line is used;
  classify the line into a main line when the calculated improved value of the index value is equal to or larger than a predetermined threshold; and classify the line into a sub line when the calculated improved value of the index value is smaller than the predetermined threshold.

3. The communication apparatus according to claim 1, wherein the at least one processor is further configured to execute the instructions to allocate the data amount of the media data to the respective lines that have been classified into the main lines in accordance with a ratio of the communication rates of the respective lines that have been classified into the main lines.

4. The communication apparatus according to claim 1, further comprising:
at least one communication circuit that corresponds to the respective lines, wherein
the at least one processor is further configured to execute the instructions to allocate the data amount of the media data to the respective lines that have been classified into the main lines in such a way that the ratio of the communication rates of the respective lines that have been classified into the main lines matches the ratio of the total value of the data amount of the media data when the media data is allocated to the respective lines that have been classified into the main lines and a data amount buffered in the line and a communication circuit connected to the line.

5. The communication apparatus according to claim 1, wherein the at least one processor is further configured to execute the instructions to transmit a part of the media data transmitted from the main lines via at least one line classified into the sub lines in a duplicate way.

6. The communication apparatus according to claim 1, wherein the at least one processor is further configured to execute the instructions to:
estimate probability distribution of communication rates of the respective lines; and
allocate the data amount of the media data to the respective lines in such a way that an expected value of the delay time calculated from the probability distribution of the communication rate of the each line becomes a minimum.

7. The communication apparatus according to claim 1, wherein the at least one processor is further configured to execute the instructions to:
estimate the communication rates of the respective lines; and
classify the respective lines into main lines;
calculate the index value from a total value of the communication rates of the respective lines; and
determine a bit rate that corresponds to an index value that is reduced from the calculated index value by a specified value set in advance to be the bit rate of the media data.

8. The communication apparatus according to claim 5, wherein the at least one processor is further configured to execute the instructions to transmit a part of the media data to at least one line classified into the sub lines in an order that is different from the order in which the media data transmitted from the main line is transmitted.

9. A media distribution method comprising:
estimating communication qualities of a plurality of respective lines that distribute media data to another communication apparatus;
calculating, from the estimated communication qualities of the respective lines, an index value indicating a quality of user experience when each of the lines is used and determining a bit rate of the media data based on the calculated index value; and
allocating a data amount of the media data to the respective lines based on the estimated communication qualities of the respective lines and the bit rate that has been determined,
wherein the communication quality is a communication rate, and
wherein the media distribution method further comprises:
classifying the respective lines into main lines that mainly perform transmission of the media data and sub lines that auxiliarily perform transmission of the media data based on the calculated index value; and
determining a total value of the communication rates of all the lines that have been classified into the main lines or a value obtained by multiplying the total value by a predetermined coefficient to be the bit rate of the media data.

10. A non-transitory computer readable medium storing a program for causing a computer to execute the following processing of:
estimating communication qualities of a plurality of respective lines that distribute media data to another communication apparatus;
calculating, from the estimated communication qualities of the respective lines, an index value indicating a quality of user experience when each of the lines is used and determining a bit rate of the media data based on the calculated index value; and
allocating a data amount of the media data to the respective lines based on the estimated communication qualities of the respective lines and the bit rate that has been determined,
wherein the communication quality is a communication rate, and
wherein the program further comprises:
classifying the respective lines into main lines that mainly perform transmission of the media data and sub lines that auxiliarily perform transmission of the media data based on the calculated index value; and
determining a total value of the communication rates of all the lines that have been classified into the main lines or a value obtained by multiplying the total value by a predetermined coefficient to be the bit rate of the media data.

11. A communication apparatus comprising:
at least one memory storing instructions; and
at least one processor configured to execute the instructions to:
estimate communication qualities of a plurality of respective lines that distribute media data to another communication apparatus;
calculate, from the estimated communication qualities of the respective lines, an index value indicating a quality of user experience when each of the lines is used and determine a bit rate of the media data based on the calculated index value;
allocate a data amount of the media data to the respective lines based on the estimated communication qualities of the respective lines and the bit rate that has been determined;
estimate probability distribution of communication rates of the respective lines; and
allocate the data amount of the media data to the respective lines in such a way that an expected value of the delay time calculated from the probability distribution of the communication rate of the each line becomes a minimum.

12. A media distribution method comprising:
estimating communication qualities of a plurality of respective lines that distribute media data to another communication apparatus;
calculating, from the estimated communication qualities of the respective lines, an index value indicating a quality of user experience when each of the lines is used and determining a bit rate of the media data based on the calculated index value;
allocating a data amount of the media data to the respective lines based on the estimated communication qualities of the respective lines and the bit rate that has been determined;
estimating probability distribution of communication rates of the respective lines; and
allocating the data amount of the media data to the respective lines in such a way that an expected value of the delay time calculated from the probability distribution of the communication rate of the each line becomes a minimum.

13. A non-transitory computer readable medium storing a program for causing a computer to execute the following processing of:
estimating communication qualities of a plurality of respective lines that distribute media data to another communication apparatus;
calculating, from the estimated communication qualities of the respective lines, an index value indicating a quality of user experience when each of the lines is used and determining a bit rate of the media data based on the calculated index value;
allocating a data amount of the media data to the respective lines based on the estimated communication qualities of the respective lines and the bit rate that has been determined;
estimating probability distribution of communication rates of the respective lines; and
allocating the data amount of the media data to the respective lines in such a way that an expected value of the delay time calculated from the probability distribution of the communication rate of the each line becomes a minimum.

\* \* \* \* \*